(12) United States Patent
O'Neill et al.

(10) Patent No.: US 10,466,095 B1
(45) Date of Patent: Nov. 5, 2019

(54) MULTI-LOAD CELL WEIGHING SHELF

(71) Applicant: AMAZON TECHNOLOGIES, INC., Seattle, WA (US)

(72) Inventors: Nathan Pius O'Neill, Snohomish, WA (US); Amey Madhukar Teredesai, Redmond, WA (US); Thomas Duester, Seattle, WA (US); Edwin Louis Howard, Seattle, WA (US); Nicolas Adam Kurczewski, Seattle, WA (US); Eric Mathew Clayton, Seattle, WA (US); Alexander Michael Frenkel, Seattle, WA (US); Benjamin Jozef Gyori, Seattle, WA (US); Graham Cyril Jordan, Snohomish, WA (US); Ismael Medrano, Seattle, WA (US); Somasundaram Niranjayan, Issaquah, WA (US); Christopher Robert Renner, San Diego, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 147 days.

(21) Appl. No.: 15/634,695

(22) Filed: Jun. 27, 2017

(51) Int. Cl.
| | | |
|---|---|---|
| *G01G 21/23* | (2006.01) | |
| *G01G 3/14* | (2006.01) | |
| *G01G 19/414* | (2006.01) | |
| *G01G 21/28* | (2006.01) | |
| *G06Q 10/08* | (2012.01) | |
| *G01G 3/142* | (2006.01) | |

(52) U.S. Cl.
CPC ............ *G01G 21/23* (2013.01); *G01G 3/142* (2013.01); *G01G 19/4144* (2013.01); *G01G 21/28* (2013.01); *G06Q 10/087* (2013.01)

(58) Field of Classification Search
CPC .... G01G 3/142; G01G 21/23; G01G 19/4144; G01G 21/28; G06Q 10/087
See application file for complete search history.

(56) References Cited

U.S. PATENT DOCUMENTS

| | | | | | |
|---|---|---|---|---|---|
| 4,396,079 | A | * | 8/1983 | Brendel ............... | G01G 3/1402 177/154 |
| 4,986,376 | A | * | 1/1991 | Cone ...................... | G01G 21/23 177/128 |

(Continued)

OTHER PUBLICATIONS

Dimech, Andrew, "Weight Sensing Shelves", Video from YouTube, 3:20 duration, uploaded on Sep. 24, 2015. Retrieved from Internet: https://www.youtube.com/watch?v=71GboW_pWWc.

(Continued)

*Primary Examiner* — Randy W Gibson
(74) *Attorney, Agent, or Firm* — Lindauer Law, PLLC

(57) ABSTRACT

A fixture includes a shelf upon which items may be placed. In one implementation, the shelf is supported by four load cells that provide load cell data that may be used to calculate weight data for the load on the shelf. The load cells are mounted underneath a frame, with an upper portion of a load mount extending upward through the frame and engaged to the shelf. The shelf and the frame include stiffeners to increase rigidity, improving the quality of the load cell data. Electronics and a wiring harness are located underneath the frame. In this configuration, assembly of the fixture may be accomplished completely from the underside, simplifying assembly.

22 Claims, 11 Drawing Sheets

(56) References Cited

U.S. PATENT DOCUMENTS

| | | | |
|---|---|---|---|
| 5,033,562 A * | 7/1991 | Cone | G01G 21/23 177/128 |
| 5,515,737 A * | 5/1996 | Imai | G01G 3/18 177/211 |
| 5,561,274 A | 10/1996 | Brandorff | |
| 5,623,128 A * | 4/1997 | Grimm | G01G 3/1406 177/211 |
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,113,431 B2 * | 2/2012 | Gregerson | G06K 7/10722 235/383 |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 9,473,747 B2 | 10/2016 | Kobres et al. | |
| 10,121,121 B1 * | 11/2018 | De Bonet | G06Q 10/087 |
| 2011/0011936 A1 | 1/2011 | Morandi et al. | |
| 2012/0284132 A1 | 11/2012 | Kim et al. | |
| 2013/0284806 A1 | 10/2013 | Margalit | |
| 2014/0201041 A1 | 7/2014 | Meyer | |
| 2014/0297487 A1 | 10/2014 | Bashkin | |
| 2015/0075879 A1 | 3/2015 | Sakai et al. | |
| 2015/0086107 A1 | 3/2015 | Dedeoglu et al. | |
| 2017/0228686 A1 | 8/2017 | Rodriguez et al. | |
| 2018/0164148 A1 * | 6/2018 | Mueller | G01G 23/007 |

OTHER PUBLICATIONS

Mutschler, Joseph M., "Non-final Office Action dated Dec. 10, 2018", U.S. Appl. No. 15/195,964, The United States Patent and Trademark Office, Dec. 10, 2018.

"Type PB Load Cell", Flintec, www.flintec.com, Retrieved from the Internet: <URL: https://www.flintec.com/wp-content/uploads/2016/09/pb-planar-datasheet-en.pdf>.

Asthana, et al., "An Indoor Wireless System for Personalized Shopping Assistance", CiteSeerX, In Proceedings of IEEE Workshop on Mobile Computing Systems and Applications, 1994. Retrieved from the Internet: <URL:http://citeseerx.ist.psu.edu/viewdoc/summary?doi=10.1.1.127.3033>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

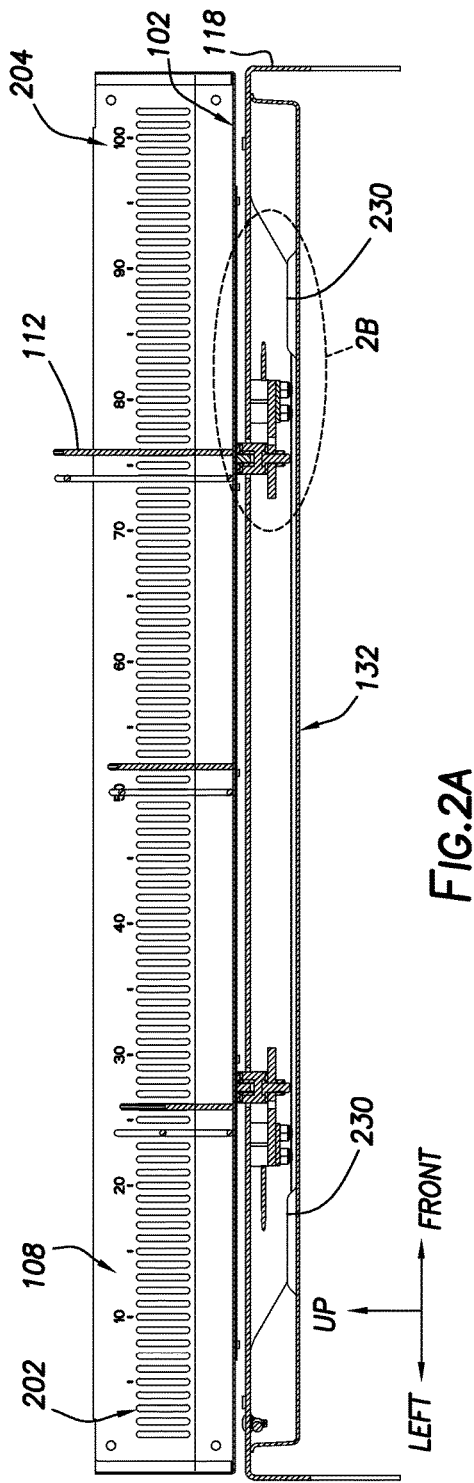
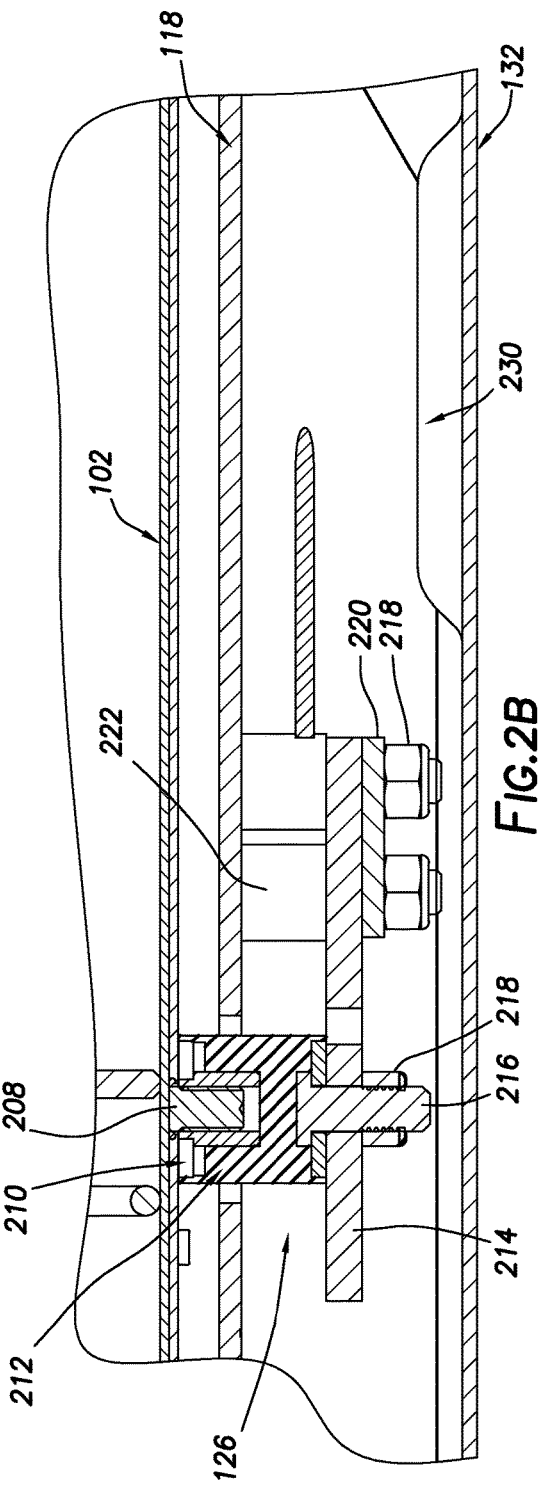
FIG.2A
FIG.2B

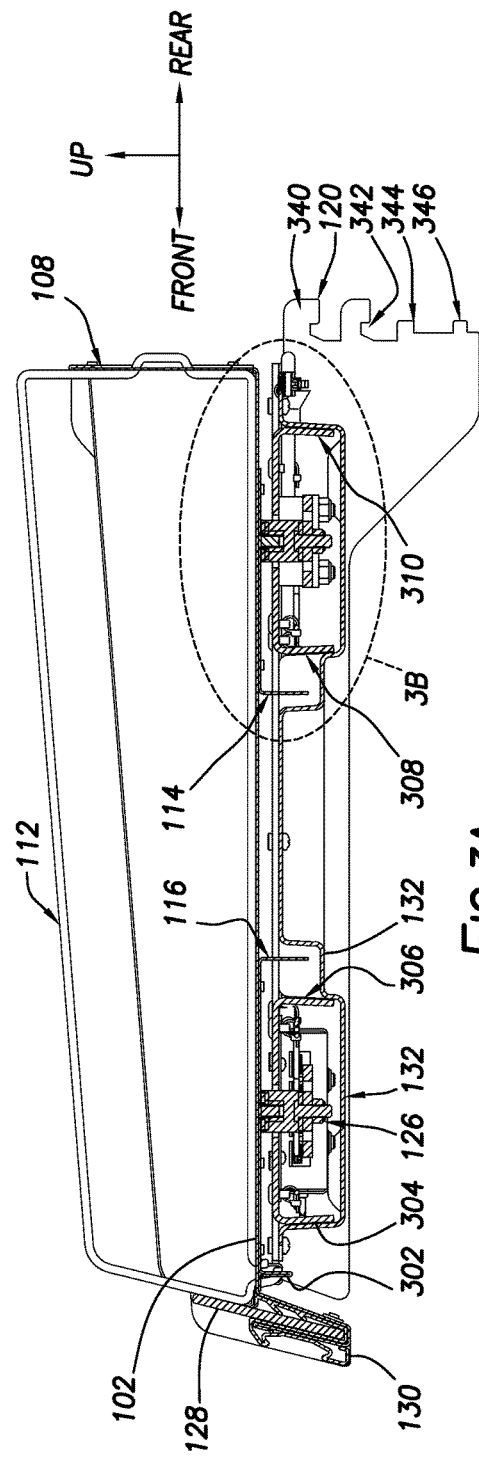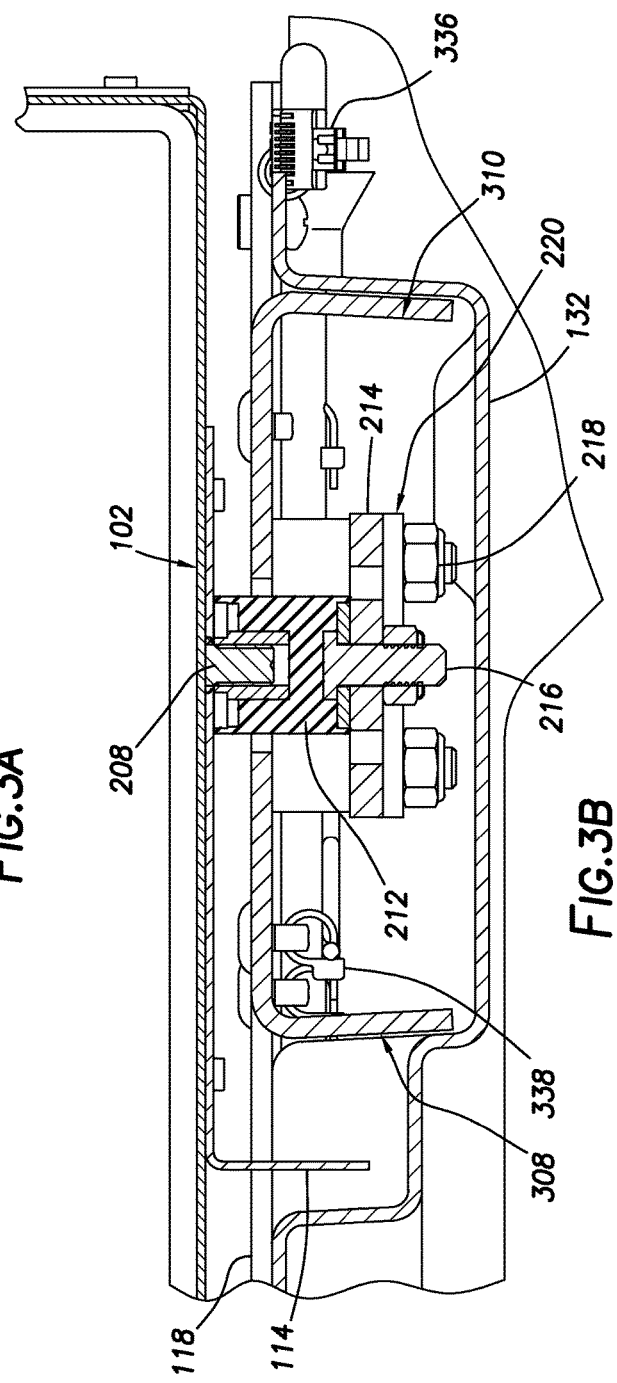

MULTI-LOAD CELL WEIGHING SHELF

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other distribution pathways (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory at various places within the facility.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

FIG. 2A depicts a cross section of the fixture of FIG. 1, according to some implementations.

FIG. 2B depicts an enlarged cross section of a load cell assembly of the fixture of FIG. 1, according to some implementations.

FIG. 3A depicts a cross section of the fixture of FIG. 1, according to some implementations.

FIG. 3B depicts an enlarged cross section of the load cell assembly of the fixture of FIG. 1, according to some implementations.

Figure 1:
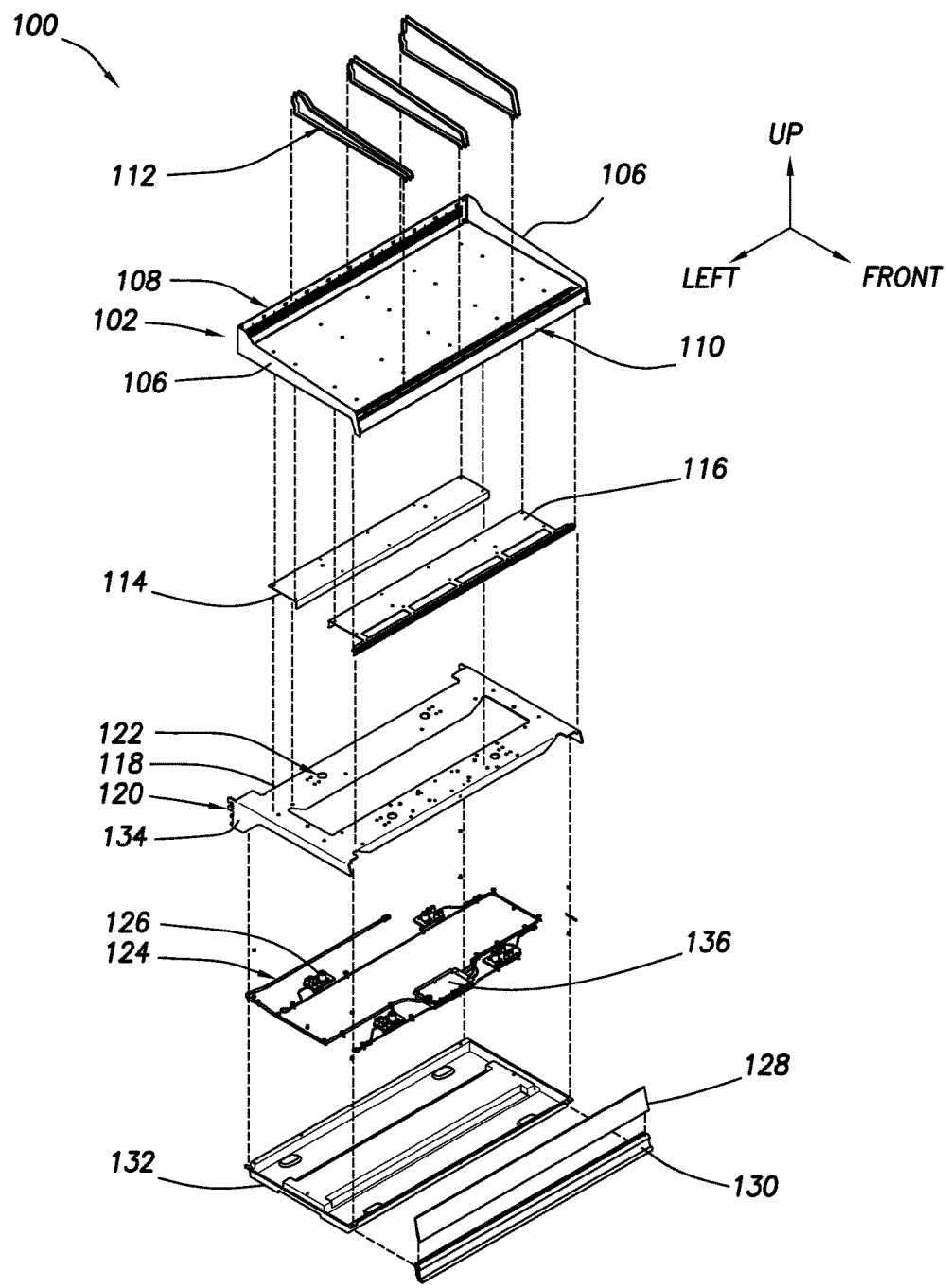
FIG. 1 illustrates an exploded view of a fixture with multiple load cells and a shelf, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A materials handling facility (facility) or other setting may utilize fixtures that have shelves to stow or otherwise hold items. The fixtures may include a shelf that is mounted to two or more load cell assemblies via a load mount that extends down through a frame. The load cell assemblies are in turn mounted to the underside of the frame. The load mount may be compliant. For example, the load mount may comprise an elastomer such as rubber.

Each load cell assembly comprises at least one transducer that generates a signal responsive to a physical change, such as compression of the transducer or deformation of the transducer that is affixed to a supporting member. For example, the load cell assembly may comprise a planar beam load cell. During operation, weight data is generated based on signals from the transducers. That weight data may then be sent to an external device, such as a server, using a communication interface.

Stiffeners may be applied to the shelf to increase the rigidity and minimize mechanical oscillation during use. Stiffening features may be incorporated into the frame to improve rigidity of that member, also minimizing mechanical oscillation during use.

The fixtures described in this disclosure may be used in a variety of different environments. Some fixtures may be configured to operate in an ambient environment, such as experienced within a retail store. Other fixtures may be configured to operate in refrigerated or heated environments. For example, a circuit board of the shelf may be sealed using a conformal coating to prevent damage due to moisture or corrosion. In another example, the circuit board may be mounted within a protective housing.

The circuit board may include one or more lights, such as light emitting diodes, that may be used to provide information about operation of the fixture. A light pipe may be used to convey at least a portion of the light to a location on the fixture that is visible. For example, the light pipe may have a first end proximate to the light on the circuit board and a second end proximate to a hole in a bottom cover of the fixture.

The fixtures may be supported in different ways. For example, the frame may include brackets that allow for mounting to a gondola or shelf upright. Different engagement features may be provided to allow for mounting in different positions. For example, the configuration of hooks on a bracket designed for mounting on a bottommost portion of a gondola may differ from the configuration designed for mounting farther up on the gondola. In another example, the fixture may include feet or other features, allowing the fixture to rest on another surface, such as the bottom of a freezer case.

Assembly of the fixture is facilitated by the designs described in this disclosure. The fixture may be assembled upside down, removing the need to flip the fixture over during the assembly process. As a result, assembly costs are reduced. For example, the physical configuration of the frame, the load cell assemblies, and shelf, allow them to be joined together while upside down. Once joined, a wiring harness, electronics, and bottom cover may be installed.

The fixture may include other features. For example, the fixture may include mechanical features to engage a ticket channel, dividers to maintain different types of items in different lanes on the shelf, and so forth.

By using the devices and techniques described herein, a fixture that includes multiple load cells may be easily assembled and installed. Once installed, the overall structure provides physical protection to the components therein from the rigors of a high-use environment. The fixture may be easily cleaned without risk of damaging the components. The fixture may be used in an ambient or refrigerated environment, and so forth. In addition to reductions to cost of manufacturing and installation, the fixture provides weight data that may be used to facilitate operation of the facility. For example, the weight data may be used to determine what item has been removed from which lane on the shelf.

Illustrative System

FIG. 1 illustrates an exploded view of a fixture 100 with multiple load cells and a shelf, according to some implementations. The fixture may include a shelf 102. The shelf 102 is configured to stow one or more items. For example, products for sale may rest upon the shelf 102 during use.

In some implementations, such as depicted here, the shelf 102 may include a left sidewall 106(1) and a right sidewall 106(2). The sidewalls 106 may help retain items within the shelf 102, provide stiffness to the shelf 102, and so forth. A rear crossmember 108 may extend along a rear edge of the shelf 102 from the left sidewall 106(1) to the right sidewall 106(2). Relative to a plane described by a surface of the shelf 102, the rear crossmember 108 may be at approximately a right angle thereto. A front crossmember 110 may extend along a front edge of the shelf 102 from the left sidewall 106(1) to the right sidewall 106(2). The rear crossmember 108 may be taller than the front crossmember 110. In other implementations, the shelf 102 may omit one or more of the sidewalls 106, the rear crossmember 108, or the front crossmember 110.

One or more dividers 112 may be affixed to the shelf 102. The dividers 112 may comprise wire, sheet material, and so forth. For example, the dividers 112 may comprise acrylic plastic. The dividers 112 may be used to maintain the items stowed on the shelf 102 into particular lanes. In some implementations, each lane may hold a different type of item. For example, one lane may hold boxes of tea while another lane may hold boxes of coffee. The dividers 112 may be configured to mechanically engage one or more features in the shelf 102. For example, the rear crossmember 108 may have slots into which a portion of a divider 112 may be inserted.

The shelf 102 is supported directly by the load mounts that are in turn part of the load cell assembly 126. In this implementation, the shelf 102 may have one or more stiffeners or stiffening features.

In some implementations the shelf 102 may be configured to contain liquid spills. For example, the shelf 102 may form a closed basin. Should a liquid item leak onto the shelf, the resulting spill may either be contained within the basin, or may be directed to openings, channeling the liquid to a particular location.

In other implementations, the shelf 102 may be supported by a platform. The shelf 102 may rest atop the platform that is supported by the load cell assemblies, or may be affixed using one or more fasteners. For example, the shelf 102 may be screwed to the platform. In other implementations, the platform may support other accessories such as bins, auto-facing units, and so forth.

A rear stiffener 114 and a front stiffener 116 may be attached to the shelf 102. For example, the rear stiffener 114 and the front stiffener 116 may be attached to an underside of the shelf 102 and extend from proximate to a left side of the shelf 102 to proximate to a right side of the shelf 102. The long axis of the stiffeners may be parallel to a long axis of the shelf 102. The stiffeners increase the stiffness of the shelf 102, helping to minimizing flexure under the influence of a force, such as the weight of the shelf 102 or items stowed thereon. As illustrated here, the rear stiffener 114 and the front stiffener 116 are arranged to their respective lips that project downward pass into a hole in the frame 118. In another implementation, the lip of the stiffener may be proximate to one or more of a front or back of the frame 118. For example, the lip of the rear stiffener 114 may be proximate to a stiffener that is proximate to a rear of the frame 118. In another example, the lip of the front stiffener 116 may be proximate to a stiffener that is proximate to a front of the frame 118. In still another implementation, one or more of the rear stiffener 114 or the front stiffener 116 may each have two downward facing lips, one in front and one in back, forming a U shaped cross section that opens downward.

In one implementation one or both of the rear stiffener 114 and the front stiffener 116 may have a cross-section that includes one or more bends. For example, the rear stiffener 114 and the front stiffener 116 may include at least one downward bend of their respective materials to produce an "L" shaped cross section. In other implementations, other cross-sections may be used. For example, the stiffeners may have a "W" shaped cross-section, "C" shaped cross section, "U" shaped cross-section, pleated cross-section, and so forth. In some implementations, the rear stiffener 114 and the front stiffener 116 may exhibit different cross-sections. The stiffeners may be affixed to the shelf 102 using one or more of fasteners, adhesives, welds, and so forth. For example, the rear stiffener 114 and the front stiffener 116 may be riveted to the shelf 102.

Beneath the shelf 102 and its associated rear stiffener 114 and front stiffener 116, is a frame 118. The frame 118 includes one or more brackets 134. The brackets 134 are configured to mechanically engage a structure such as an upright of a gondola. The brackets 134 may include one or more engagement features 120. For example, the engagement features 120 may include hooks, tabs, notches, and so forth. These engagement features 120 are configured to mate with a corresponding feature of the structure. For example, the engagement features 120 may comprise hooks that fit within corresponding slots within an upright rail of the gondola. As illustrated here, the frame 118 may include a left bracket 134(1) and a right bracket 134(2). The left bracket 134(1) may extend downwards from a left side of the frame 118 and may include a first set of engagement features 120(1). The right bracket 134(2) extends downwards from a right side of the frame 118 and may include a second set of engagement features 120(2). This arrangement of engagement features 120 may be suitable for engaging part of an upright of the gondola or other structure. Other arrangements of engagement features 120 suitable for other mountings are depicted in more detail below with regard to FIGS. 7 and 8.

In some implementations, the frame 118 may comprise a single piece of material. For example, the frame 118 may comprise a steel sheet that has been one or more of cut, punched, bent, and so forth to produce the desired shape. In other implementations, the frame 118 may comprise multiple pieces of material that have been joined together. For example, the support brackets 134 may be separate pieces that are affixed to a body of the frame 118 during assembly of the frame.

The frame 118 includes a plurality of load mount holes 122. These holes 122 provide a passageway for a load mount of the load cell assembly 126. As described in more detail below, the bulk of the load cell assembly 126 is arranged underneath the frame 118, with the load mount protruding up through the load mount hole 122. The underside of the shelf 102 or the underside of the associated rear stiffener 114 and the front stiffener 116 may be affixed to the load mount.

Underneath the frame 118 is a wiring harness 124. This placement allows the upper surface of the frame 118 to be left unobstructed for the shelf 102. The wiring harness 124 may comprise one or more conductors that establish a connection between the transducer in the load cell assemblies and electronics 136. In some implementations, the wiring harness 124 may utilize connectors. For example, the wiring harness may utilize an RJ-45 plug to connect wires from the individual load transducers to corresponding RJ-45 jacks connected to the electronics 136. The electronics 136 may comprise a computing device with one or more of a processor and a memory, the processor configured to execute instructions. Load cell data may be determined based on output from the transducer. For example, the electronics 136 may include analog to digital converters (ADC) that convert analog output from the transducers in the load cell assembly 126 to load cell data. An analog filter may be located between the transducer and the ADC. For example, the filter may be a third-order filter with an upper cutoff frequency of between 25 Hz and 60 Hz. Continuing the example, the load cell data may be indicative of the electrical resistance measured across the transducer. For example, the load cell data may be indicative of a voltage measured across the transducer. In one implementation, the load cell data may be sent using a communication interface to an external device, such as a server. The external device may process the load cell data to generate weight data. For example, the load cell data for a plurality of transducers may be processed using one or more algorithms to determine weight data.

The electronics 136 may comprise one or more circuit boards. The circuit boards may be rigid or flexible. The electronics 136 or a portion thereof may be protected using one or more of a conformal coating, epoxy, enclosures, and so forth. For example, the circuit board of the electronics 136 may be sealed within a conformal coating that prevents ingress of moisture from the surrounding environment. In another example, the circuit board may be mounted within a protective housing. For example, the circuit board may be within a plastic housing that is affixed to an underside of the frame 118.

In some implementations, a front stop 128 may be installed to the fixture 100. The front stop 128 may prevent items stowed on the shelf 102 from falling off of the front of the shelf. For example, the front stop 128 may restrain items on the shelf that are being pushed forward under the influence of a spring mounted to the rear crossmember 108.

The front stop 128 may be configured to be inserted into a recess within a ticket channel 130. The ticket channel 130, in turn, may be mounted to the front of the fixture 100. For example, the ticket channel 130 may be configured to mechanically engage a front lip of the shelf 102. The ticket channel 130 may include one or more features configured to hold a ticket, placard, preprinted paper, and so forth. For example, information indicative of the item associated with a particular lane and its cost may be printed on a ticket, and that ticket may be held in place by the engagement features of the ticket channel 130.

A bottom cover 132 may be affixed to an underside of the frame 118. For example, the bottom cover 132 may comprise an injection molded plastic cover that may be screwed to the underside of the frame 118.

FIG. 2A depicts a cross section of the fixture 100 of FIG. 1, according to some implementations. In this cross-section, the view is looking from the front and towards the back of the fixture 100.

The rear crossmember 108 is depicted. In the implementation shown, the rear crossmember 108 includes a plurality of slots 202. The slots are arranged vertically and provide a feature into which at least a portion of a divider 112 may be inserted. In some implementations, reference indicia 204 may be provided. For example, the reference indicia 204 may be printed, engraved, etched, stamped, and so forth onto or within the material that forms the rear crossmember 108. The reference indicia 204 may be used to facilitate specific placement of the dividers 112.

Shown within this cross-section is the shelf 102 and the frame 118 below. The shelf 102 and the frame 118 are separated by a gap. The gap may be sized such that placement of too much weight upon the shelf 102 will result in the gap being closed and the shelf 102 bottoming out upon the top surface of the frame 118 before the load transducers or other components of the load cell assembly 126 are damaged.

The bottom cover 132 may include one or more recesses 230 suitable for the installation of feet. In some implementations, instead of the support brackets 134, the fixture 100 may rest upon another surface. Feet (not shown) may be installed within the recesses 230, and may protrude at least in part on the lower edge of the bottom cover 132.

FIG. 2B depicts an enlarged cross section of a load cell assembly 126 of the fixture 100 of FIG. 1, according to some implementations. A shelf mounting post 208 extends down from the shelf 102. The shelf mounting post 208 may be inserted through a washer 210. The shelf mounting post 208 may extend down into an upper end of a load mount 212. The shelf mounting post 208 extends for only a portion of the length of the load mount 212.

The load mount 212 may comprise an elastomeric material. For example, the load mount 212 may comprise natural rubber, silicone rubber, and so forth. In one implementation, the load mount 212 may exhibit a hardness of 70 on the Shore D scale. The load mount 212 may allow for compressive support and transverse or horizontal motion.

In other implementations, other types of load mount 212 may be used. For example, the load mount 212 may comprise a spring or ball and socket arrangement.

The placement of the load mount 212 and the corresponding hole in the frame 118 through which the load mount 212 passes may be arranged to improve performance of the device. The load mounts 212 may be located at a distance from a left and right edge, respectively, of between 0.23 and 0.43 of the width of the frame 118. For example, the load mounts 212 may be positioned at points that are approximately one-third of the way between a left edge and a right edge of the frame 118.

A lower portion of the load mount 212 is affixed to a first end of a load cell plate 214 using a frame mounting post 216. For example, the frame mounting post 216 may comprise a bolt with a threaded portion and that protrudes down and through a corresponding hole in the load cell plate 214. This threaded portion may be engaged by a fastener 218, such as a nut.

At a second end of the load cell plate 214, a mounting plate 220 is positioned beneath the load cell plate 214. One or more spacers 222 maintain a predetermined distance between an underside of the frame 118 and the upper side of the load cell plate 214. The spacers 222 may comprise a rigid metal, plastic, ceramic, and so forth. One or more fasteners, such as bolts may pass through one or more spacers 222, through the load cell plate 214, through the mounting plate 220, to the frame 118. One or more fasteners 218 may be used to secure the mounting plate 220, the load cell plate 214, and the spacers 222 to the underside of the frame 118.

As illustrated here, the majority of the load cell assembly 126 is present beneath the frame 118. The load cell assembly 126 operates in a cantilevered fashion with the first end supporting the shelf 102 while the second end is joined to the frame 118. With this configuration, the bulk of the mechanics of the load cell assembly 126 are accessible from underneath the frame 118, facilitating easy assembly during manufacture and disassembly should repairs need to be made.

As used in this disclosure, two or more components may be joined using a variety of different techniques. These joining components may be either removable, or not. For example, components may be joined using one or more of threaded nuts and bolts, screws, cams, and so forth. These fasteners may be engaged or disengaged allowing for relatively easy separation of the two components. In another example, components may be joined using adhesives, welding, crimping, riveting, and so forth. These are not necessarily intended to be removeable, and may require specialized equipment, solvents, techniques, and so forth. For example, a weld may need to be ground or cut away to separate the components previously joined thereby.

FIG. 3A depicts a cross section of the fixture 100 of FIG. 1, according to some implementations. A front lip 302 of the shelf 102 is depicted. In this implementation, the front lip 302 is proximate to a front of the shelf 102 and extends downwards. The front lip 302 may provide additional stiffness to the shelf 102.

The frame 118 may include one or more stiffener features to improve the rigidity of the frame 118. In the implementation depicted here, the stiffener features comprise a bend of a portion of the material of the frame 118 downwards. For example, stiffener features 304, 306, 308, and 310 comprise portions of the material of the frame 118 that have been bent or otherwise formed downward to form a lip at an approximate right angle with the plane of the frame 118. These stiffener features 306-310 may be configured such that the axis along which they are bent extends parallel to a long axis of the frame 118. For example, the stiffener features 306-310 may extend from a left side to a right side of the frame 118. To form the stiffener features 306 and 308, a hole or opening within the frame 118 may be formed, and material at the edges of the hole may be bent to form the stiffener features 306 and 308. In other implementations, separate stiffener pieces may be affixed to the frame 118.

A front pair of stiffener features comprising stiffener features 304 and 306 form a first bay. A second pair of stiffener features comprising stiffener features 308 and 310 form a second bay. Within each of the respective bays are a pair of load cell assemblies 126. The first bay may also be used to house the electronics 136. The wiring harness 124 may pass at least in part through the first bay and the second bay.

In some implementations, the downward bends of one or more of the front stiffener 116 or the rear stiffener 114 may be arranged proximate to the stiffener features 306 and 308 of the frame 118, respectively. For example, the downward bend of the front stiffener 116 may be positioned to between 1 mm and 4 mm away from the downward bend of the stiffener feature 306. Continuing the example, the lip formed by the downward bend of the rear stiffener 114 may be positioned to between 1 mm and 4 mm away from the lip formed by the downward bend of the stiffener feature 308. This proximity between these pieces constrains movement between the frame 118 and the shelf 102. This constraint may prevent damage to the device during installation, use, and so forth. For example, during installation a drop and subsequent impact of an edge of the device with the ground would result in movement of the shelf 102 with respect to the frame 118. If unconstrained, damage to the load mounts 212 or load cell assemblies 126 may take place. The proximity of the lips to one another restricts such lateral movement.

Also shown in this cross-section, are the engagement features 120 of the support bracket, according to one implementation. In this implementation, the engagement features 120 include a pair of hooks 340 extending away from the body of the support bracket 134. Each hook 340 includes a notch 342. A first tab 344 and a second tab 346 extend away from the body of the support bracket 134. In some implementations, the first tab 344 may be larger than the second tab 346. In other implementations, other configurations of engagement features 120 may be used. For example, the bottom edge of the support bracket 134 may be below the first tab 344, and the second tab 346 may be omitted.

In other implementations other arrangements of the support brackets 134 may be used. For example, the support bracket 134 may extend upward from the frame 118. The engagement features 120 may be located at or above the lowermost portion of the bottom cover 132. In another example, the support bracket 134 may extend up above a bottom of the shelf 102.

FIG. 3B depicts an enlarged cross section of the load cell assembly 126 of the fixture 100 of FIG. 1, according to some implementations. In this view, the load mount 212 is visible and provides mechanical support between the load cell plate 214 and the shelf 102.

As described above, in some implementations portions of the wiring harness 124 may utilize connectors to couple to the electronics 136, or other devices that are external to the fixture 100. In this view, a portion of a connector 336, such as an RJ-45 connector, is shown. For example, this may be a portion of the connector 336 that is used to connect the electronics 136 to an external device, such as an ethernet switch, CANBUS, and so forth.

One or more cable ties 338 or other devices may be used to retain a portion of the wiring harness 124 to the frame 118.

Figure 4:
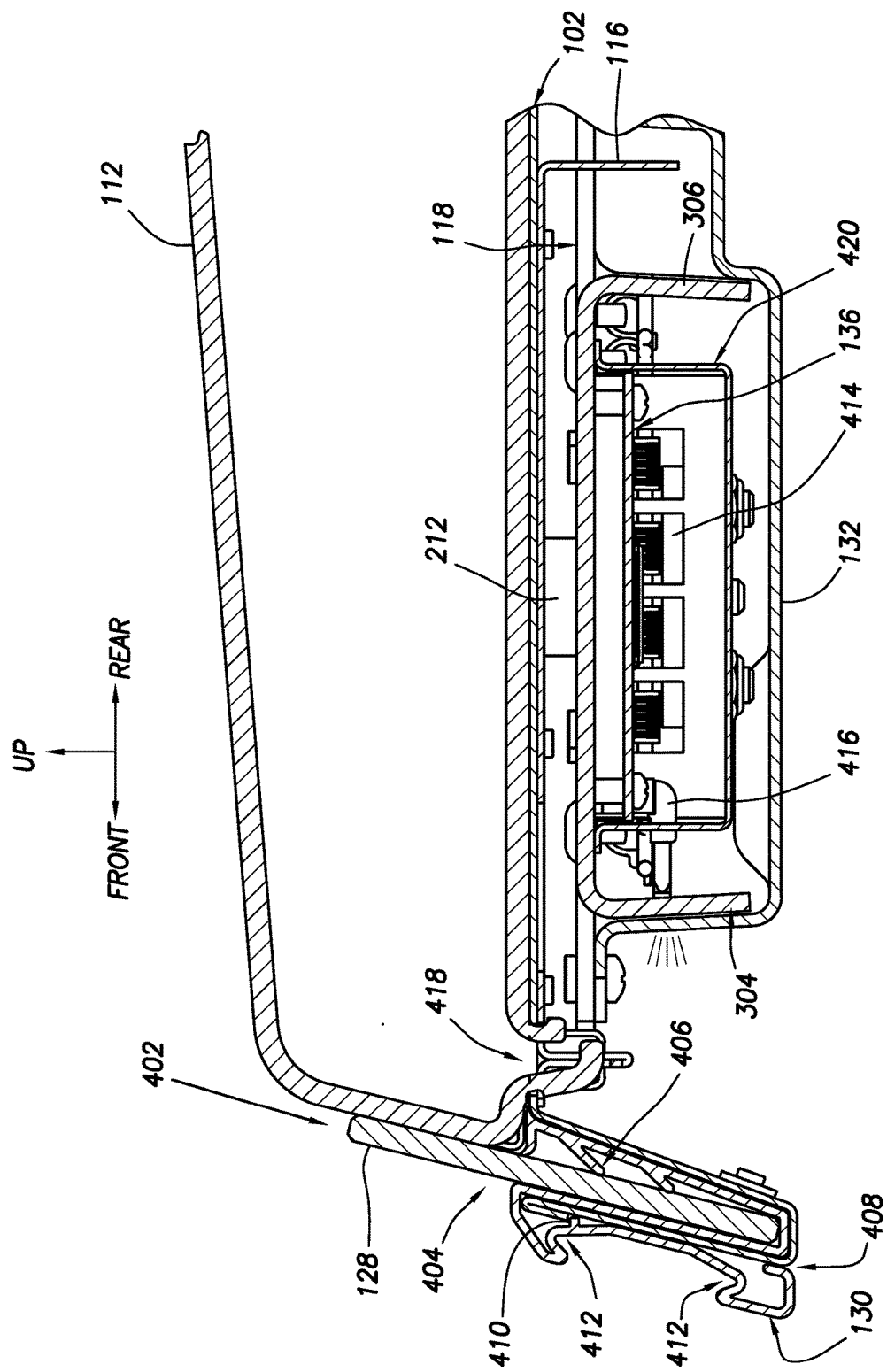
FIG. 4 depicts an enlarged cross section of a front of the fixture of FIG. 1, according to some implementations.

FIG. 4 depicts an enlarged cross section of a front of the fixture 100 of FIG. 1, according to some implementations. In this cross-section, the shelf 102 is visible. A divider 112 is shown engaged to the shelf 102. For example, a front hook or other feature of the divider 112 is inserted into a divider front hole 418. One or more of these divider front holes 418 may be arranged along the front of the shelf 102.

Shown here is the ticket channel 130 that includes a front stop channel 404. The front stop channel 404 comprises a generally U-shaped cross-section with an opening at the top into which the front stop 128 may be inserted along the direction indicated by arrow 402. Within the front stop channel 404 are one or more stop retention features 406. For example, the stop retention features 406 may comprise flanges or ridges that protrude away from a wall of the front stop channel 404.

The ticket channel 130 itself may include a mounting channel 408. The mounting channel 408 may comprise a generally U-shaped cross-section with an opening at the bottom. During installation, the mounting channel 408 may be positioned above a portion of the shelf 102, such as a lip extending upwards. Upon moving the ticket channel 130 downwards, the lip from the shelf 102 is inserted into the mounting channel 408. Within the concavity of the mounting channel 408 may be one or more features. For example one feature may comprise a ridge 410 that will engage a corresponding feature on the lip of the shelf 102. In this fashion, the ticket channel 130 may be prevented from inadvertently flipping off of the shelf 102. In one implementation, the ticket channel 130 may comprise a plastic that is been formed via extrusion, injection molding, and so forth.

In other implementations, the ticket channel 130 may include one or more display devices. For example, instead of paper or plastic tags or tickets, the ticket channel 130 may include an electrophoretic, liquid crystal, or other display to present information to users.

A front portion of the ticket channel 130 may include ticket engagement features 412 such as small recesses or concavities into which an edge of the ticket may be retained.

Visible in this cross-section is a portion of the first bay and the electronics 136 therein. Visible on the circuit board of the electronics 136 are four connector jacks 414. For example, depicted here are RJ-45 connector jacks 414. These jacks may be used to connect portions of the wiring harness that in turn provide connectivity to the load cell transducers, external devices, and so forth.

A light pipe 416 is shown that is used to provide an optical pathway between a light source such as a light-emitting diode (LED) and an exterior of the fixture 100. One end of the light pipe 416 is optically coupled to the light source. The light pipe 416 may comprise a transparent or translucent plastic that extends from proximate to the light source, through a hole in the front stiffener feature 304, electronics cover 420, and the bottom cover 132. The light transferred by the light pipe 416 from the LED or the light source to the exterior may be used for diagnostics, troubleshooting, status indicator, and so forth with regard to the operation of the electronics 136, transducers, and so forth.

The electronics cover 420 may be used to improve electromagnetic compatibility (EMC). For example, the electronics cover 420 may be grounded and used to provide a shield that prevents ingress or egress of radio frequency interference. In some implementations, the electronics cover 420 may provide environmental protection to the electronics 136 therein. As described above, in some implementations the electronics 136 or portion thereof may be protected using a conformal coating.

Figure 5:
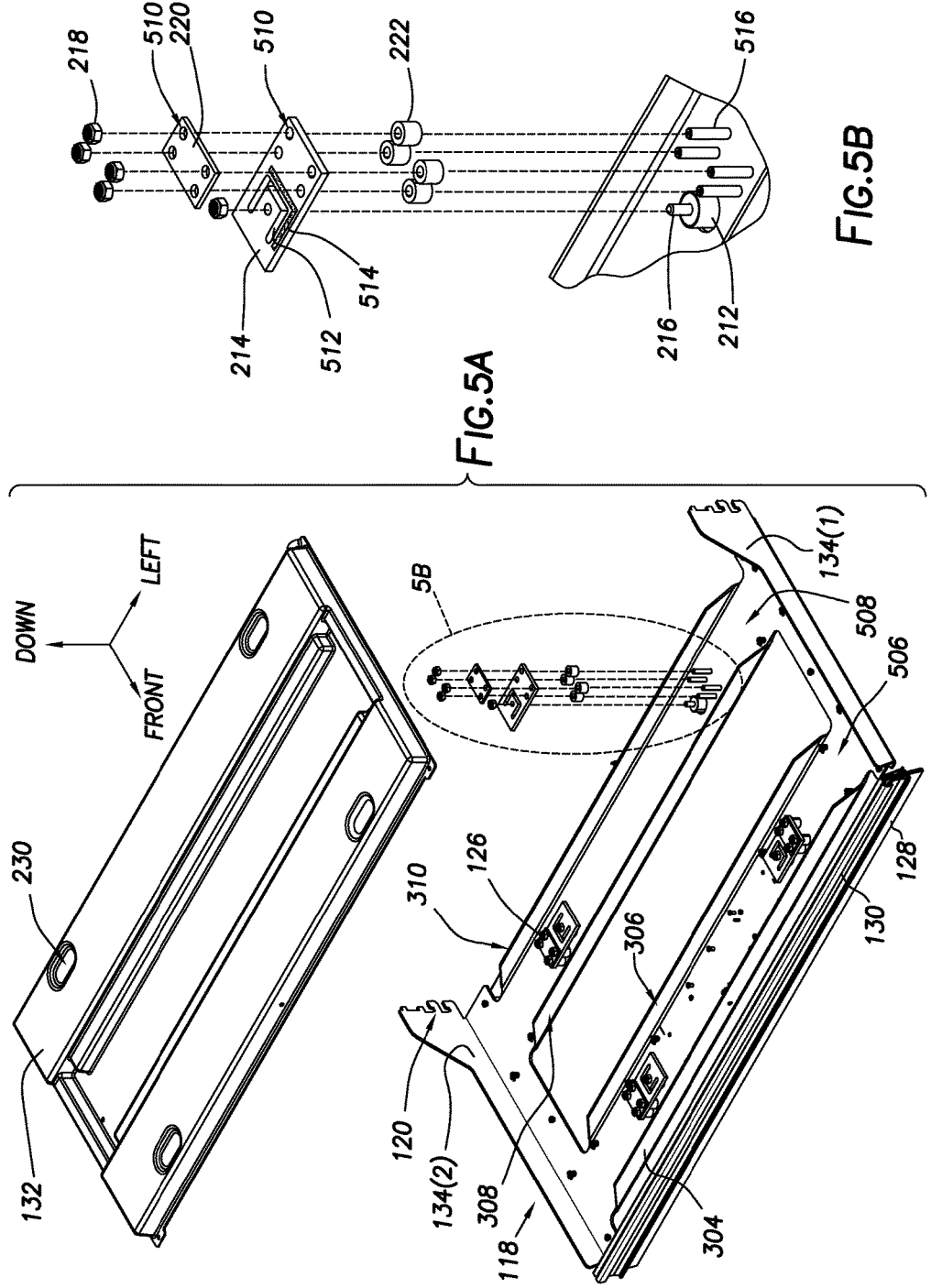
FIG. 5A illustrates an exploded underside view of the fixture of FIG. 1, according to some implementations.
FIG. 5B illustrates an enlarged exploded underside view of the load cell assembly, according to some implementations.

FIG. 5A illustrates an exploded underside view of the fixture 100 of FIG. 1, according to some implementations. The features of the fixture 100 as described herein allow for assembly and maintenance from a single side of the fixture 100. For example, the fixture 100 may be assembled in an upside down configuration due to the placement and arrangement of the fasteners, load cell assembly 126, and so forth.

In the exploded view, the bottom cover 132 is visible along with the recesses 230 for the feet, should they be utilized.

The frame 118 is depicted showing the left bracket 134(1) and the right bracket 134(2). Shown is a front crossbar 506 that extends from the left to the right side of the frame 118. Along a portion of the front crossbar 506 are the stiffener features 304 and 306 that form a portion of the first bay. Similarly, a rear crossbar 508 that extends from the left to the right side of the frame 118 is shown. Along a portion of the rear crossbar 508 are the stiffener features 308 and 310 that form a portion of the second bay.

Within the bays are the load cell assemblies 126. For example, two load cell assemblies 126 are located within the first bay and two load cell assemblies 126 are located within the second bay.

FIG. 5B illustrates an enlarged exploded underside view of the load cell assembly, according to some implementations. In this view, the holes 510 in the load cell plate 214 and the mounting plate 220 through which fasteners may pass are shown. The load cell plate 214 may include a release cut out 512. For example, the release cut out 512 may be U-shaped, with the bottom of the "U" still attached to the load cell plate 214 proximate to a first end of the load cell plate 214. A transducer 514 is shown. In one implementation, the transducer 514 may be arranged proximate to one or more sides of the release cut out 512.

The transducer 514 may comprise a strain gauge that measures deformation of at least a portion of the load cell plate 214 when weight is applied. By measuring a change in the electrical characteristic of the strain gauge, such as capacitance or resistance, the weight may be determined. For example, the transducer 514 may comprise an electrically resistive strain gauge. As the electrically resistive strain gauge is deformed, the electrical resistance it presents changes. A lookup table or function may be used to associate a particular electrical resistance with a particular weight. In some implementations, the load cell plate 214 and the transducer 514 may be referred to as a planar beam load cell.

As shown in this exploded view, the load cell assembly 126 may be installed from the underside of the frame 118. For example, the shelf 102 may be placed facedown on a work surface. The frame 118 may be place facedown onto the underside of the shelf 102. A fastener 516 such as a threaded rod, bolt, or screw, may be affixed to the underside of the frame 118. The spacers 222 may be placed onto the fasteners 516. The fasteners 516 may extend up through the holes 510 into the load cell plate 214 and through the mounting plate 220 whereupon fasteners 218, such as nuts are used to secure the assembly. Similarly, the frame mounting post 216 passes through a hole within the area defined by the release cut out 512 and is secured by another fastener 218 such as a nut. The load cell assembly 126 now secured, has joined the shelf 102 to the frame 118. During subsequent assembly steps, the wiring harness 124 may be installed underneath the frame 118. The bottom cover 132 may then be installed. In those implementations requiring them, feet may be installed into the recesses 230.

In other implementations, the load cell assembly 126 may be affixed to the frame 118 using other techniques. Mechanical interference features, such as ridges, rails, grooves, and so forth may be used to allow the load cell assembly 126 to be affixed to the frame 118 without the use of fasteners. For example, the frame 118 may include ridges that extend and into which a portion of the load cell plate 214 may be slid into and engaged.

Figure 6:
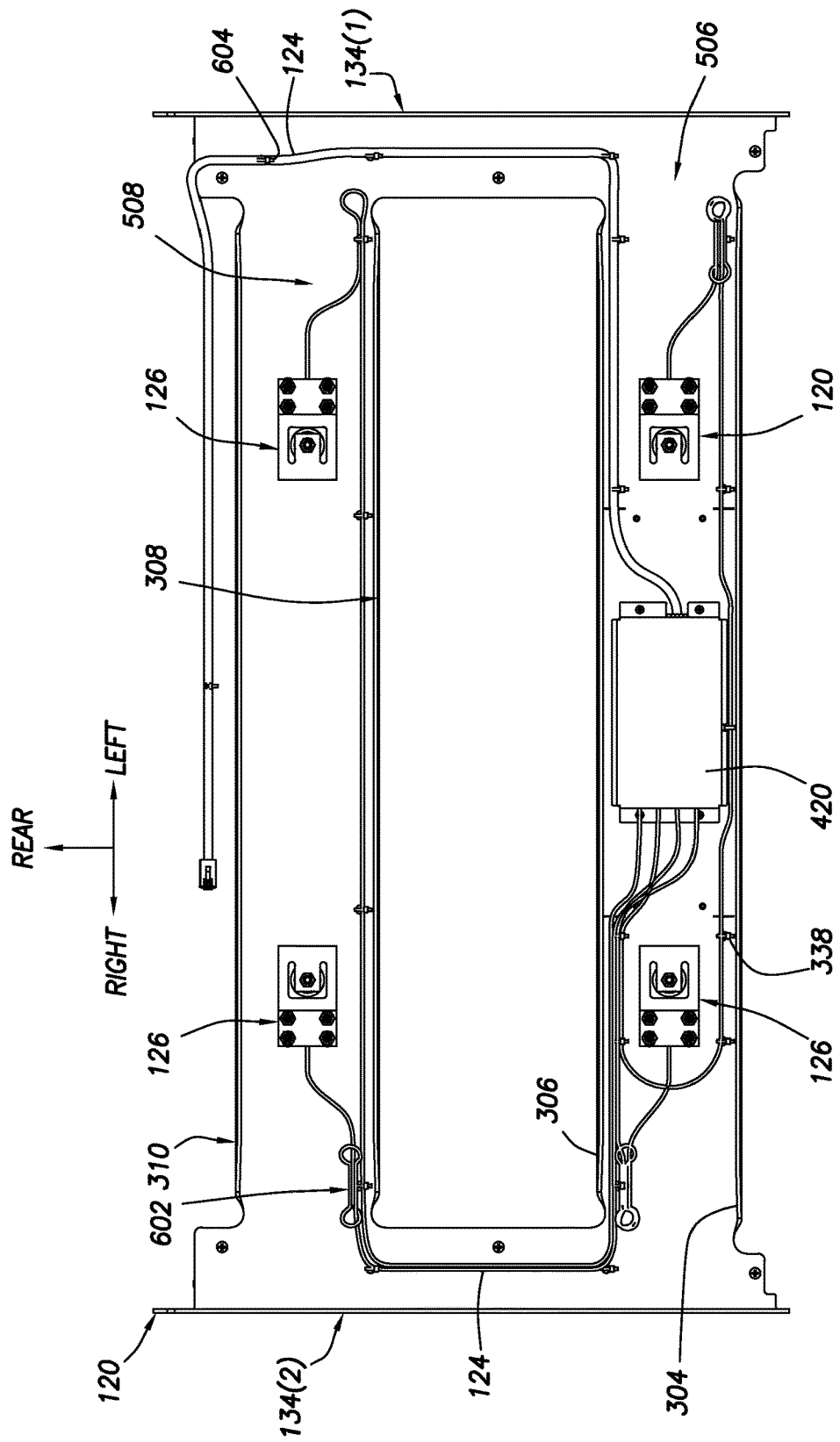
FIG. 6 illustrates an underside view of a frame with the load cell assemblies, wiring harness, and electronics installed, according to some implementations.

FIG. 6 illustrates an underside view of the frame 118 with the load cell assemblies 126, wiring harness 124, and electronics 136 installed, according to some implementations. In the implementation depicted here, there are four load cell assemblies 126. Two load cell assemblies 126 associated with each of the front crossbar 506 and the rear crossbar 508. Each of the load cell assemblies 126 is relatively proximate to one of the corners of the outer perimeter of the frame 118.

In the implementation depicted here at 602, a portion of the wiring from each of the load cell transducers 514 is arranged in a zig-zag or serpentine arrangement. By folding and arranging the wiring in this fashion, electromagnetic noise is reduced. For example, the lector magnetic noise emitted by the wiring may be reduced, electromagnetic noise received by the wiring may be reduced, and so forth. Cable ties 338 may be used to secure the wiring in the wiring harness 124 to the frame 118.

A portion of the wiring harness 124 may include a pigtail 604. The pigtail 604 may terminate in a connector, such as an RJ-45 connector. The pigtail 604 may be configured to engage a corresponding jack, such as with an ethernet switch or bus associated with a gondola.

As shown in this figure, a long axis of the load cell plate 214 may be parallel to a long axis of the frame 118. In the implementation depicted here, the load cell assemblies 126 are mounted to the frame 118 in mirror fashion with respect to left and right. For example, the load cell assemblies 126 may be mounted to the frame 118 at points on their respective load cell plates 214 that are distal to a center of the frame 118. In other implementations, other mounting orientations of the load cell assemblies 126 may be utilized.

An opening is visible between the front crossbar 506 and the rear crossbar 508. As described above in some implementations, a portion of the frame 118 may be bent or otherwise formed to produce the stiffener features 304-310. In other implementations, the frame 118 may be formed without the opening.

Figure 7:
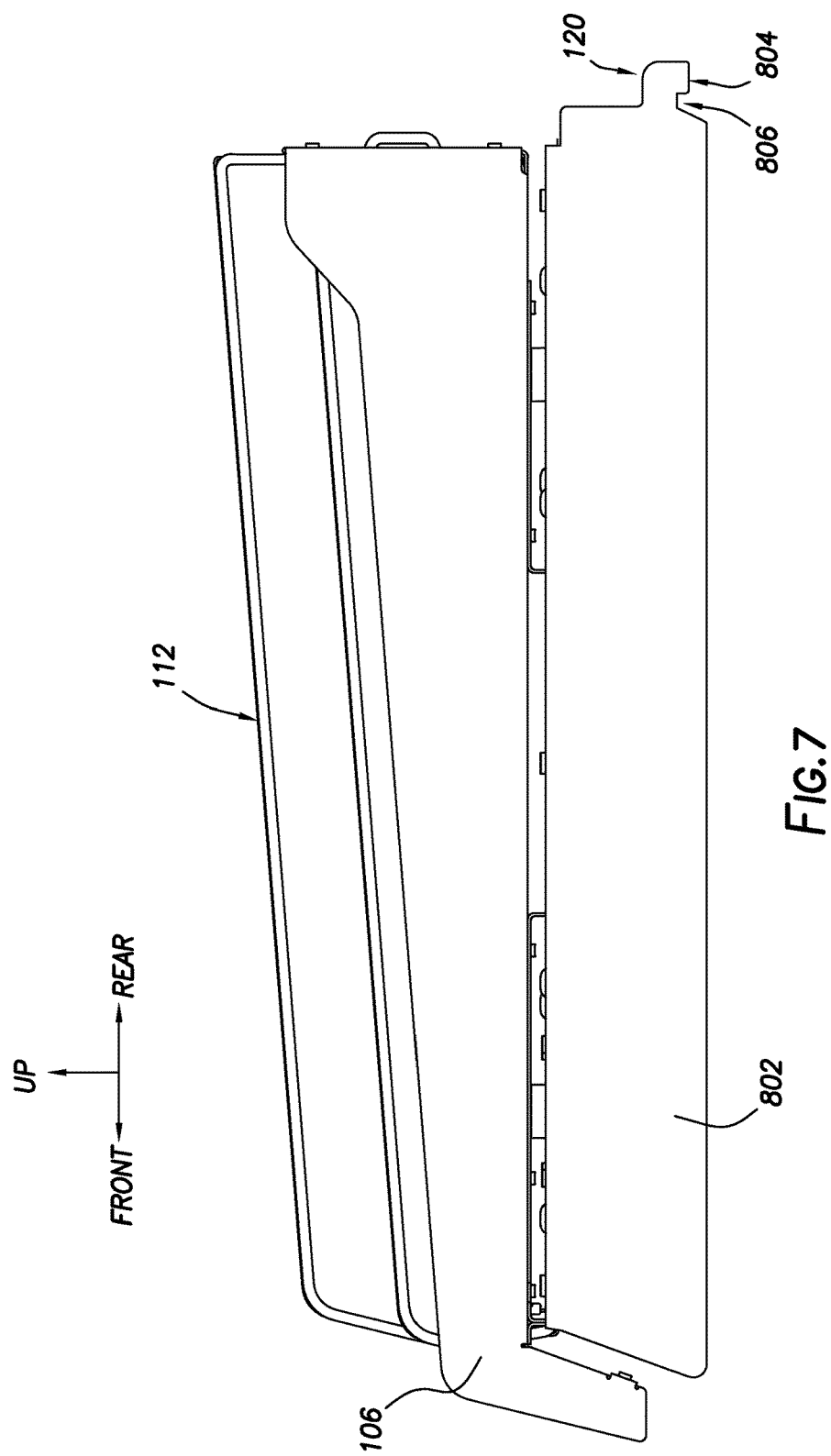
FIG. 7 illustrates a side view of one implementation in which the fixture has brackets configured to mount to a bottom portion of a gondola, according to some implementations.

FIG. 7 illustrates a side view of one implementation in which the fixture 100 has support brackets 134 configured to mount to a bottom portion of a gondola, according to some implementations. In some implementations, it may be desirable to mount the fixture 100 and a very lowest portion of a gondola. Traditional engagement systems may not allow access to this lowest portion. The implementation depicted here, includes a support bracket 802 with an engagement feature comprising a single hook 804 extending from the body of the support bracket 802 and a corresponding notch 806. In this configuration, the fixture 100 may be mounted at or very close to a bottom of the gondola.

Figure 8:
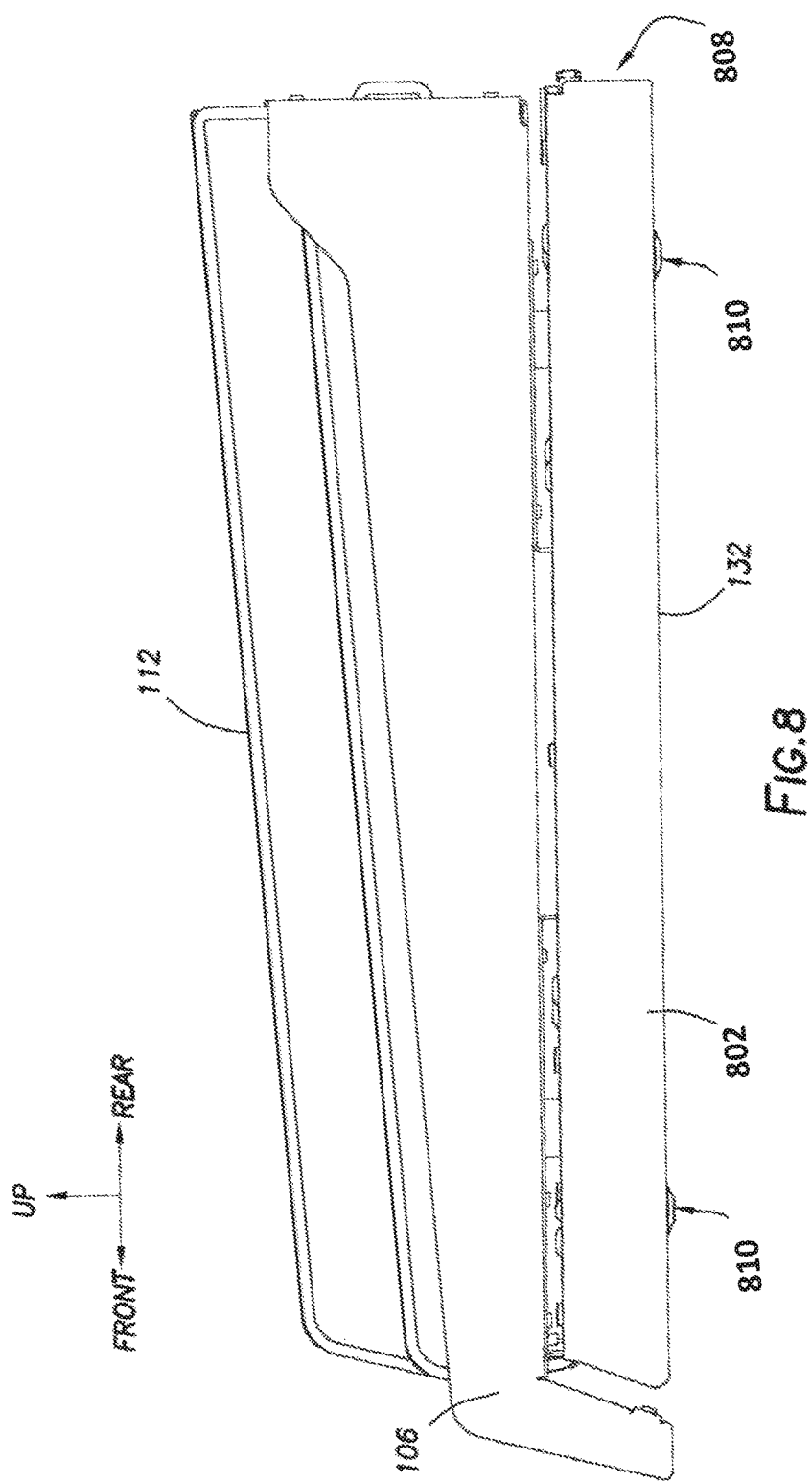
FIG. 8 illustrates a side view of one implementation in which the fixture has feet and is configured to rest on a surface, according to some implementations.

FIG. 8 illustrates a side view of an implementation in which the fixture 100 has feet and is configured to rest on a surface, according to some implementations. In some implementations, it may be desirable to rest the fixture 100 on another surface. For example, within a refrigerated case the implementation of the fixture 100 depicted here may be placed on the interior bottom surface of the refrigerated case. In another example, the fixture 100 may be placed on a counter or table top.

In this implementation, the support bracket 802 has a flat back 808 with no engagement features 120. Instead, one or more feet 810 extend below the bottom most portion of the bottom cover 132. These feet may then rest upon the surface beneath.

Figure 9:
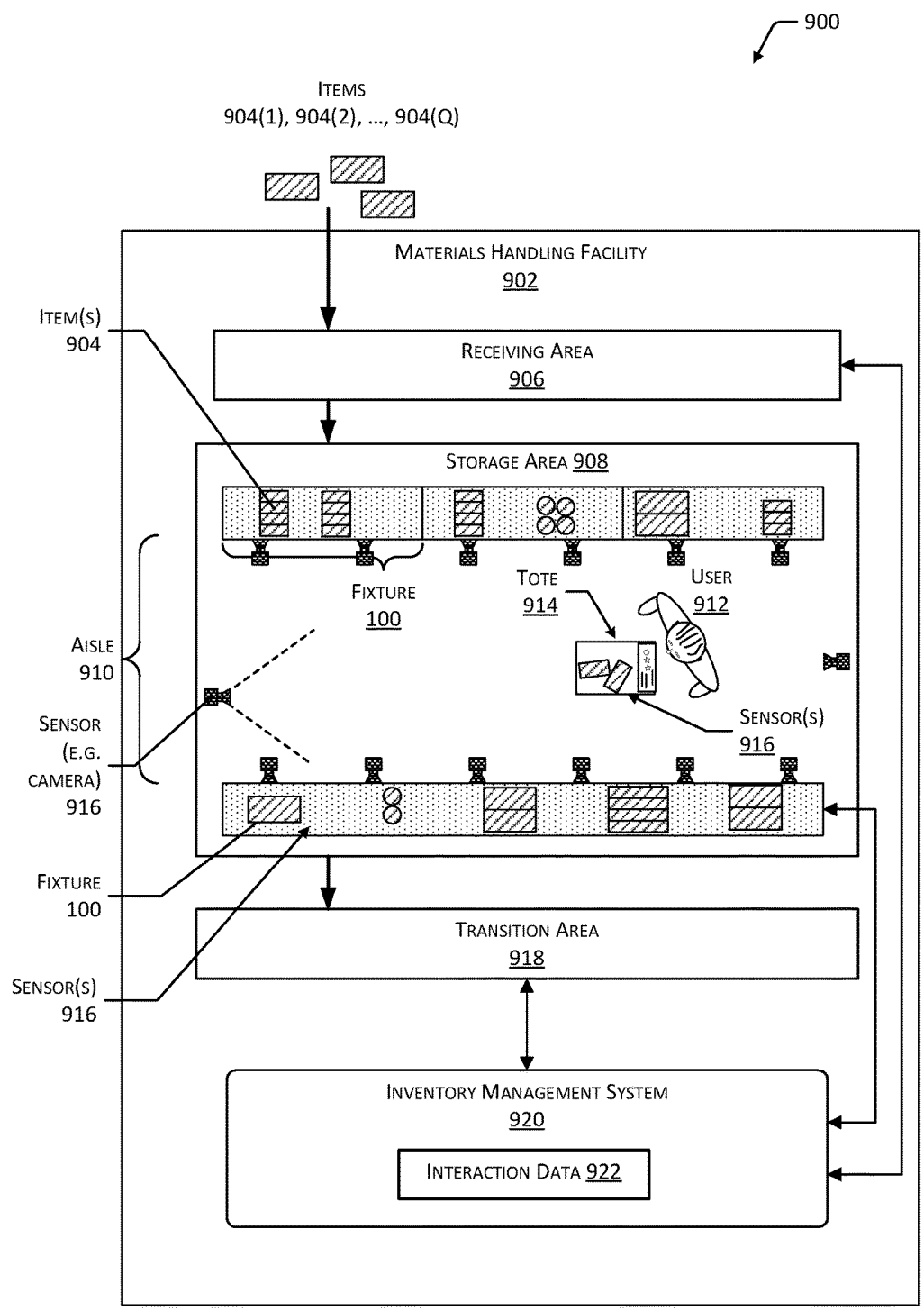
FIG. 9 is a block diagram illustrating a materials handling facility (facility) using the system, according to some implementations.

FIG. 9 is a block diagram 900 illustrating a materials handling facility (facility) 902 using the system, according to some implementations. A facility 902 comprises one or more physical structures or areas within which one or more items 904(1), 904(2), . . . , 904(Q) may be held. As used in this disclosure, letters in parenthesis such as "(Q)" indicate an integer value greater than or equal to zero. The items 904 may comprise physical goods, such as books, pharmaceuticals, repair parts, electronic gear, and so forth.

The facility 902 may include one or more areas designated for different functions with regard to inventory handling. In this illustration, the facility 902 includes a receiving area 906, a storage area 908, and a transition area 918.

The receiving area 906 may be configured to accept items 904, such as from suppliers, for intake into the facility 902. For example, the receiving area 906 may include a loading dock at which trucks or other freight conveyances unload the items 904. In some implementations, the items 904 may be processed, such as at the receiving area 906, to generate at least a portion of item data. For example, an item 904 may be imaged or otherwise scanned to develop reference images or representations of the item 904 at the receiving area 906.

The storage area 908 is configured to store the items 904. The storage area 908 may be arranged in various physical configurations. In one implementation, the storage area 908 may include one or more aisles 910. The aisle 910 may be configured with, or defined by, fixtures such as those described above that are arranged along one or both sides of the aisle 910. The fixtures may also be movable such that the arrangements of aisles 910 may be reconfigurable. In some implementations, the fixtures may be configured to move independently of an outside operator. For example, the fixtures may comprise a rack with a power source and a motor, operable by a computing device to allow the rack to move from one location within the facility 902 to another.

One or more users 912(1), 912(2), . . . , 912(U) and totes 914(1), 914(2), . . . , 914(T) or other material handling apparatus may move within the facility 902. For example, the user 912 may move about within the facility 902 to pick or place the items 904 in various fixtures, placing them on the tote 914 for ease of transport. The tote 914 is configured to carry or otherwise transport one or more items 904. For example, the tote 914 may include a basket, cart, bag, bin, and so forth. In other implementations, other material handling apparatuses such as robots, forklifts, cranes, aerial drones, and so forth, may move about the facility 902 picking, placing, or otherwise moving the items 904. For example, a robot may pick an item 904 from a first fixture 100(1) and move the item 904 to a second fixture 100(2).

One or more sensors 916 may be configured to acquire information in the facility 902. The sensors 916 may include, but are not limited to, cameras 916(1), depth sensors 916(2), load cell transducers 514, optical sensor arrays 916(13), proximity sensors 916(6), and so forth. The sensors 916 may be stationary or mobile, relative to the facility 902. For example, as described above the shelves may contain load cell transducers 514 to generate weight signals, cameras 916(1) to acquire images of picking or placement of items 904 on shelves, optical sensor arrays 916(13) to detect shadows of the user's 912 hands at the fixtures, and so forth. In another example, the facility 902 may include a camera 916(1) to obtain images of the user 912 or other objects in the facility 902. The sensors 916 are discussed in more detail below with regard to FIG. 10.

While the storage area 908 is depicted as having one or more aisles 910, fixtures storing the items 904, sensors 916, and so forth, it is understood that the receiving area 906, the transition area 918, or other areas of the facility 902 may be similarly equipped. Furthermore, the arrangement of the various areas within the facility 902 is depicted functionally rather than schematically. For example, in some implementations, multiple different receiving areas 906, storage areas 908, and transition areas 918 may be interspersed rather than segregated in the facility 902.

The facility 902 may include, or be coupled to, an inventory management system 920. The inventory management system 920 is configured to interact with users 912 or devices such as sensors 916, robots, material handling equipment, computing devices, and so forth, in one or more of the receiving area 906, the storage area 908, or the transition area 918.

During operation of the facility 902, the sensors 916 may be configured to provide sensor data, or information based on the sensor data, to the inventory management system 920. The sensor data may include image data, non-image data, weight data obtained from load cell transducers 514, and so forth. The sensors 916 are described in more detail below with regard to FIG. 10.

The inventory management system 920 or other systems may use the sensor data to track the location of objects within the facility 902, movement of the objects, or provide other functionality. Objects may include, but are not limited to, items 904, users 912, totes 914, and so forth. For example, a series of images acquired by the camera 916(1) may indicate removal by the user 912 of an item 904 from a particular location on the fixture and placement of the item 904 on or at least partially within the tote 914.

The facility 902 may be configured to receive different kinds of items 904 from various suppliers and to store them until a customer orders or retrieves one or more of the items 904. A general flow of items 904 through the facility 902 is indicated by the arrows of FIG. 9. Specifically, as illustrated in this example, items 904 may be received from one or more suppliers, such as manufacturers, distributors, wholesalers, and so forth, at the receiving area 906. In various implementations, the items 904 may include merchandise, commodities, perishables, or any suitable type of item 904, depending on the nature of the enterprise that operates the facility 902.

Upon being received from a supplier at the receiving area 906, the items 904 may be prepared for storage in the storage area 908. For example, in some implementations, items 904 may be unpacked or otherwise rearranged. The inventory management system 920 may include one or more software applications executing on a computer system to provide inventory management functions. These inventory management functions may include maintaining information indicative of the type, quantity, condition, cost, location, weight, or any other suitable parameters with respect to the items 904. The items 904 may be stocked, managed, or dispensed in terms of countable units, individual units, or multiple units, such as packages, cartons, crates, pallets, or other suitable aggregations. Alternatively, some items 904, such as bulk products, commodities, and so forth, may be stored in continuous or arbitrarily divisible amounts that may not be inherently organized into countable units. Such items 904 may be managed in terms of a measurable quantity such as units of length, area, volume, weight, time, duration, or other dimensional properties characterized by units of measurement. Generally speaking, a quantity of an item 904 may refer to either a countable number of individual or aggregate units of an item 904 or a measurable amount of an item 904, as appropriate.

After arriving through the receiving area 906, items 904 may be stored within the storage area 908. In some implementations, different types of items 904 may be stored or displayed together in the fixtures 100. In other implementations, like items 904 may be stored in different fixtures. For example, to optimize retrieval of certain items 904 having frequent turnover within a large physical facility 902, those items 904 may be stored in several different fixtures to reduce congestion that might occur at a single fixture.

When a customer order specifying one or more items 904 is received, or as a user 912 progresses through the facility 902, the corresponding items 904 may be selected or "picked" from the fixtures containing those items 904. In various implementations, item picking may range from manual to completely automated picking. For example, in one implementation, a user 912 may have a list of items 904 they desire and may progress through the facility 902 picking items 904 from fixtures within the storage area 908 and placing those items 904 into a tote 914. In other implementations, employees of the facility 902 may pick items 904 using written or electronic pick lists derived from customer orders. These picked items 904 may be placed into the tote 914 as the employee progresses through the facility 902.

After items 904 have been picked, the items 904 may be processed at a transition area 918. The transition area 918 may be any designated area within the facility 902 where items 904 are transitioned from one location to another or from one entity to another. For example, the transition area 918 may be a packing station within the facility 902. When the item 904 arrives at the transition area 918, the item 904 may be transitioned from the storage area 908 to the packing station. Information about the transition may be maintained by the inventory management system 920.

In another example, if the items 904 are departing the facility 902, a list of the items 904 may be obtained and used by the inventory management system 920 to transition responsibility for, or custody of, the items 904 from the facility 902 to another entity. For example, a carrier may accept the items 904 for transport with that carrier accepting responsibility for the items 904 indicated in the list. In another example, a user 912 may purchase or rent the items 904 and remove the items 904 from the facility 902. During use of the facility 902, the user 912 may move about the facility 902 to perform various tasks, such as picking or placing the items 904 in the fixtures.

To facilitate operation of the facility 902, the inventory management system 920 is configured to use the sensor data including the weight data and may also use other information such as item data, physical layout data, non-weight data, and so forth, to generate interaction data 922.

The interaction data 922 may provide information about an interaction, such as a pick of an item 904 from the fixture, a place of an item 904 to the fixture, a touch made to an item 904 at the fixture, a gesture associated with an item 904 at the fixture, and so forth. The interaction data 922 may include one or more of the type of interaction, interaction location identifier indicative of where from the fixture the interaction took place, item identifier, quantity change to the item 904, user identifier, and so forth. The interaction data 922 may then be used to further update the item data. For example, the quantity of items 904 on hand at a particular shelf may be changed based on an interaction that picks or places one or more items 904.

The inventory management system 920 may combine or otherwise utilize data from different sensors 916 of different types, including the load cells. For example, weight data obtained from load cells at the fixture may be used in conjunction with non-weight data such as the image data to determine the interaction data 922.

Figure 10:
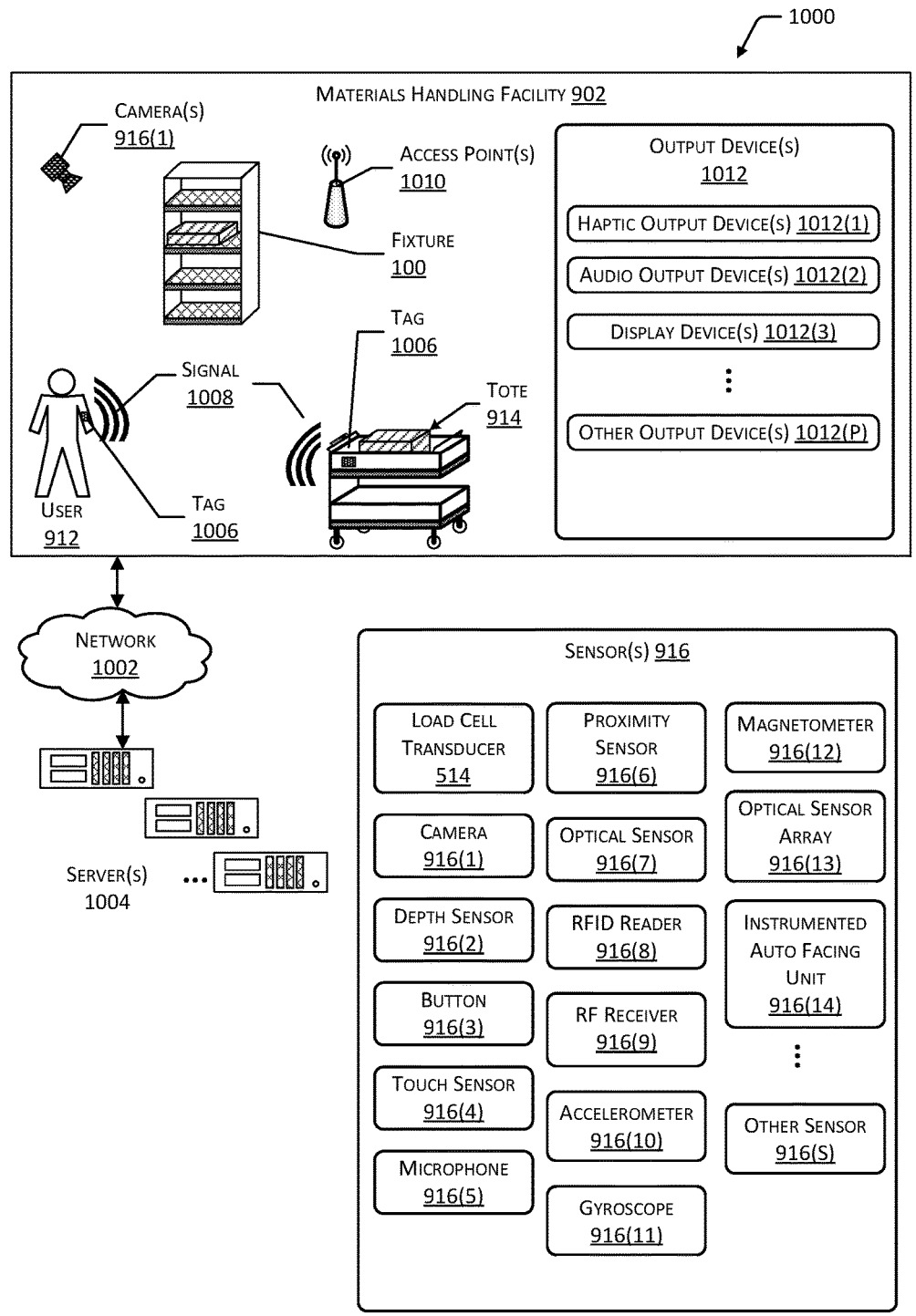
FIG. 10 is a block diagram illustrating additional details of the facility, according to some implementations.

FIG. 10 is a block diagram 1000 illustrating additional details of the facility 902, according to some implementations. The facility 902 may be connected to one or more networks 1002, which in turn connect to one or more servers 1004. The network 1002 may include private networks such as an institutional or personal intranet, public networks such as the Internet, or a combination thereof. The network 1002 may utilize wired technologies (e.g., wires, fiber optic cables, and so forth), wireless technologies (e.g., radio frequency, infrared, acoustic, optical, and so forth), or other connection technologies. The network 1002 is representative of any type of communication network, including one or more of data networks or voice networks.

The servers 1004 may be configured to execute one or more modules or software applications associated with the inventory management system 920 or other systems. While the servers 1004 are illustrated as being in a location outside of the facility 902, in other implementations, at least a portion of the servers 1004 may be located at the facility 902. The servers 1004 are discussed in more detail below with regard to FIG. 11.

The users 912, the totes 914, or other objects in the facility 902 may be equipped with one or more tags 1006. The tags 1006 may be configured to emit a signal 1008. In one implementation, the tag 1006 may be a radio frequency identification (RFID) tag 1006 configured to emit a RF signal 1008 upon activation by an external signal. For example, the external signal may comprise a radio frequency signal or a magnetic field configured to energize or activate the RFID tag 1006. In another implementation, the tag 1006 may comprise a transmitter and a power source configured to power the transmitter. For example, the tag 1006 may comprise a Bluetooth Low Energy (BLE) transmitter and battery. In other implementations, the tag 1006 may use other techniques to indicate presence of the tag 1006. For example, an acoustic tag 1006 may be configured to generate an ultrasonic signal 1008, which is detected by corresponding acoustic receivers. In yet another implementation, the tag 1006 may be configured to emit an optical signal 1008.

The inventory management system 920 may be configured to use the tags 1006 for one or more of identification of the object, determining a location of the object, and so forth. For example, the users 912 may wear tags 1006, the totes 914 may have tags 1006 affixed, and so forth, which may be read and, based at least in part on signal strength, used to determine identity and location.

Generally, the inventory management system 920 or other systems associated with the facility 902 may include any number and combination of input components, output components, and servers 1004.

The one or more sensors 916 (including the load cell transducers 514) may be arranged at one or more locations within the facility 902. For example, the sensors 916 may be mounted on or within a floor, wall, at a ceiling, at a fixture, on a tote 914, may be carried or worn by a user 912, and so forth.

The sensors 916 may include one or more load cell assemblies 126 that may include one or more transducers 514. A transducer 514 is configured to measure the weight of a load, such as the item 904, the tote 914, or other objects. The transducer 514 may be configured to measure the weight of the load at a portion of the load cell assembly 126. The transducer 514 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The transducer 514 may generate one or more signals based on an applied force, such as that of the load due to gravity. For example, the transducer 514 may comprise a strain gauge that is bonded to or otherwise affixed to the load cell plate 214, and is used to measure deformation of at least a portion of the load cell plate 214 when weight is applied. By measuring a change in the electrical characteristic of the strain gauge, such as capacitance or resistance, the weight may be determined. For example, a lookup table or function may be used to associate a particular electrical resistance with a particular weight. In another example, the transducer 514 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 920 may use the data acquired by the transducer 514 to identify an object, determine a change in the quantity of objects, determine a location of an object, maintain shipping records, and so forth.

The sensors 916 may include one or more cameras 916(1) or other imaging sensors. The one or more cameras 916(1) may include imaging sensors configured to acquire images of a scene. The cameras 916(1) are configured to detect light in one or more wavelengths including, but not limited to, terahertz, infrared, visible, ultraviolet, and so forth. The one or more cameras 916(1) may comprise charge coupled devices (CCD), complementary metal oxide semiconductor (CMOS) devices, microbolometers, and so forth. The inventory management system 920 may use image data acquired by the one or more cameras 916(1) during operation of the facility 902. For example, the inventory management system 920 may identify items 904, users 912, totes 914, and so forth, based at least in part on their appearance within the image data acquired by the one or more cameras 916(1). The one or more cameras 916(1) may be mounted in various locations within the facility 902. For example, a camera 916(1) may be mounted overhead, on fixtures, may be worn or carried by users 912, may be affixed to totes 914, and so forth.

One or more depth sensors 916(2) may also be included in the sensors 916. The depth sensors 916(2) are configured to acquire spatial or three-dimensional (3D) data, such as depth information, about objects within a field of view. The depth sensors 916(2) may include range cameras, lidar systems, sonar systems, radar systems, structured light systems, stereo vision systems, optical interferometry systems, and so forth. The inventory management system 920 may use the 3D data acquired by the depth sensors 916(2) to identify objects, determine a location of an object in 3D real space, and so forth.

One or more buttons 916(3) may be configured to accept input from the user 912. The buttons 916(3) may comprise mechanical, capacitive, optical, or other mechanisms. For example, the buttons 916(3) may comprise mechanical switches configured to accept an applied force from a touch of the user 912 to generate an input signal. The inventory management system 920 may use data from the buttons 916(3) to receive information from the user 912. For example, the tote 914 may be configured with a button 916(3) to accept input from the user 912 and send information indicative of the input to the inventory management system 920.

The sensors 916 may include one or more touch sensors 916(4). The touch sensors 916(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 920 may use data from the touch sensors 916(4) to receive information from the user 912. For example, the touch sensor 916(4) may be integrated with the tote 914 to provide a touchscreen with which the user 912 may select from a menu one or more particular items 904 for picking, enter a manual count of items 904 at a fixture, and so forth.

One or more microphones 916(5) may be configured to acquire information indicative of sound present in the environment. In some implementations, arrays of microphones 916(5) may be used. These arrays may implement beamforming techniques to provide for directionality of gain. The inventory management system 920 may use the one or more microphones 916(5) to acquire information from acoustic tags 1006, accept voice input from the users 912, determine ambient noise level, and so forth.

The sensors 916 may include proximity sensors 916(6) used to determine presence of an object, such as the user 912, the tote 914, and so forth. The proximity sensors 916(6) may use optical, electrical, ultrasonic, electromagnetic, or other techniques to determine a presence of an object. In some implementations, the proximity sensors 916(6) may use an optical emitter and an optical detector to determine proximity. For example, an optical emitter may emit light, a portion of which may then be reflected by the object back to the optical detector to provide an indication that the object is proximate to the proximity sensor 916(6). In other implementations, the proximity sensors 916(6) may comprise a capacitive proximity sensor 916(6) configured to provide an electrical field and determine a change in electrical capacitance due to the presence or absence of an object within the electrical field.

The proximity sensors 916(6) may be configured to provide sensor data indicative of one or more of a presence or absence of an object, a distance to the object, or characteristics of the object. An optical proximity sensor 916(6) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 916 such as a camera 916(1). Based on an apparent distance between the features of the structured light pattern, the distance to the object may be calculated. Other techniques may also be used to determine distance to the object. In another example, the color of the reflected light may be used to characterize the object, such as skin, clothing, tote 914, and so forth.

The sensors 916 may include one or more optical sensors 916(7). The optical sensors 916(7) may be configured to provide data indicative of one or more of color or intensity of light impinging thereupon. For example, the optical sensor 916(7) may comprise a photodiode and associated circuitry configured to generate a signal or data indicative of an incident flux of photons. As described below, the optical sensor array 916(13) may comprise a plurality of the optical sensors 916(7). For example, the optical sensor array 916(13) may comprise an array of ambient light sensors such as the ISL76683 as provided by Intersil Corporation of Milpitas, Calif., USA, or the MAX102009 as provided by Maxim Integrated of San Jose, Calif., USA. In other implementations, other optical sensors 916(7) may be used. The optical sensors 916(7) may be sensitive to one or more of infrared light, visible light, or ultraviolet light. For example, the optical sensors array 916(13) may be sensitive to infrared light, and infrared light sources such as LEDs may provide illumination.

The optical sensors 916(7) may include photodiodes, photoresistors, photovoltaic cells, quantum dot photoconductors, bolometers, pyroelectric infrared detectors, and so forth. For example, the optical sensor 916(7) may use germanium photodiodes to detect infrared light.

One or more radio frequency identification (RFID) readers 916(8), near field communication (NFC) systems, and so forth, may be included as sensors 916. For example, the RFID readers 916(8) may be configured to read the RF tags 1006. Information acquired by the RFID reader 916(8) may be used by the inventory management system 920 to identify an object associated with the RF tag 1006 such as the item 904, the user 912, the tote 914, and so forth. For example, based on information from the RFID readers 916(8) detecting the RF tag 1006 at different times and RFID readers 916(8) having different locations in the facility 902, a velocity of the RF tag 1006 may be determined.

One or more RF receivers 916(9) may also be included as sensors 916. In some implementations, the RF receivers 916(9) may be part of transceiver assemblies. The RF receivers 916(9) may be configured to acquire RF signals 1008 associated with Wi-Fi, Bluetooth, ZigBee, 2G, 3G, 4G, LTE, or other wireless data transmission technologies. In some implementations, the RF receivers 916(9) may detect signals transmitted at frequencies such as below 15 MHz. The RF receivers 916(9) may provide information associated with data transmitted via radio frequencies, signal strength of RF signals 1008, and so forth. For example, information from the RF receivers 916(9) may be used by the inventory management system 920 to determine a location of an RF source, such as a communication interface onboard the tote 914.

The sensors 916 may include one or more accelerometers 916(10), which may be worn or carried by the user 912, mounted to the tote 914, and so forth. The accelerometers 916(10) may provide information such as the direction and magnitude of an imposed acceleration. Data such as rate of acceleration, determination of changes in direction, speed, and so forth, may be determined using the accelerometers 916(10).

A gyroscope 916(11) may provide information indicative of rotation of an object affixed thereto. For example, the tote 914 or other objects may be equipped with a gyroscope 916(11) to provide data indicative of a change in orientation of the object.

A magnetometer 916(12) may be used to determine an orientation by measuring ambient magnetic fields, such as the terrestrial magnetic field. The magnetometer 916(12) may be worn or carried by the user 912, mounted to the tote 914, and so forth. For example, the magnetometer 916(12) mounted to the tote 914 may act as a compass and provide information indicative of which direction the tote 914 is oriented.

An optical sensor array 916(13) may comprise one or more optical sensors 916(7). The optical sensors 916(7) may be arranged in a regular, repeating, or periodic two-dimensional arrangement such as a grid. The optical sensor array 916(13) may generate image data. For example, the optical sensor array 916(13) may be arranged within or below a fixture and obtain information about shadows of items 904, hand of the user 912, and so forth.

The sensors 916 may include other sensors 916(5) as well. For example, the other sensors 916(S) may include light curtains, ultrasonic rangefinders, thermometers, barometric sensors, hygrometers, and so forth. For example, the inventory management system 920 may use information acquired from thermometers and hygrometers in the facility 902 to direct the user 912 to check on delicate items 904 stored in a particular fixture, which is overheating, too dry, too damp, and so forth.

In one implementation, a light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the fixture, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 912 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 912 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 912 may be used to trigger acquisition or selection of image data for processing by an analysis module.

Sensors 916 may also include an instrumented auto-facing unit (AFU) 916(14). The instrumented AFU 916(14) may comprise a position sensor configured to provide data indicative of displacement of a pusher. As an item 904 is removed from the instrumented AFU 916(14), the pusher moves, such as under the influence of a spring, and pushes the remaining items 904 in the instrumented AFU 916(14) to the front of the fixture. By using data from the position sensor, and given item data such as a depth of an individual item 904, a count may be determined, based on a change in position data. For example, if each item 904 is 1 inch deep, and the position data indicates a change of 4 inches, the quantity held by the instrumented AFU (916(14) may have changed by 4 items 904. This count information may be used to confirm or provide a cross check for a count obtained by other means, such as analysis of the image data.

In some implementations, the camera 916(1) or other sensors 916(S) may include hardware processors, memory, and other elements configured to perform various functions. For example, the camera 916(1) may be configured to generate image data, send the image data to another device such as the server 1004, and so forth.

The facility 902 may include one or more access points 1010 configured to establish one or more wireless networks. The access points 1010 may use Wi-Fi, NFC, Bluetooth, or other technologies to establish wireless communications between a device and the network 1002. The wireless networks allow the devices to communicate with one or more of the sensors 916, the inventory management system 920, the optical sensor arrays 916(13), the tag 1006, a communication device of the tote 914, or other devices.

Output devices 1012 may also be provided in the facility 902. The output devices 1012 are configured to generate signals, which may be perceived by the user 912 or detected by the sensors 916. In some implementations, the output devices 1012 may be used to provide illumination of the optical sensor array 916(13).

Haptic output devices 1012(1) are configured to provide a signal that results in a tactile sensation to the user 912. The haptic output devices 1012(1) may use one or more mechanisms such as electrical stimulation or mechanical displacement to provide the signal. For example, the haptic output devices 1012(1) may be configured to generate a modulated electrical signal, which produces an apparent tactile sensation in one or more fingers of the user 912. In another example, the haptic output devices 1012(1) may comprise piezoelectric or rotary motor devices configured to provide a vibration, which may be felt by the user 912.

One or more audio output devices 1012(2) may be configured to provide acoustic output. The acoustic output includes one or more of infrasonic sound, audible sound, or ultrasonic sound. The audio output devices 1012(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 1012(3) may be configured to provide output, which may be seen by the user 912 or detected by a light-sensitive sensor such as a camera 916(1) or an optical sensor 916(7). In some implementations, the display devices 1012(3) may be configured to produce output in one or more of infrared, visible, or ultraviolet light. The output may be monochrome or in color. The display devices 1012(3) may be one or more of emissive, reflective, microelectromechanical, and so forth. An emissive display device 1012(3), such as using LEDs, is configured to emit light during operation. In comparison, a reflective display device 1012(3), such as using an electrophoretic element, relies on ambient light to present an image. Backlights or front lights may be used to illuminate non-emissive display devices 1012(3) to provide visibility of the output in conditions where the ambient light levels are low.

The display devices 1012(3) may be located at various points within the facility 902. For example, the addressable displays may be located on fixtures, totes 914, on the floor of the facility 902, and so forth.

Other output devices 1012(P) may also be present. For example, the other output devices 1012(P) may include scent/odor dispensers, document printers, 3D printers or fabrication equipment, and so forth.

Figure 11:
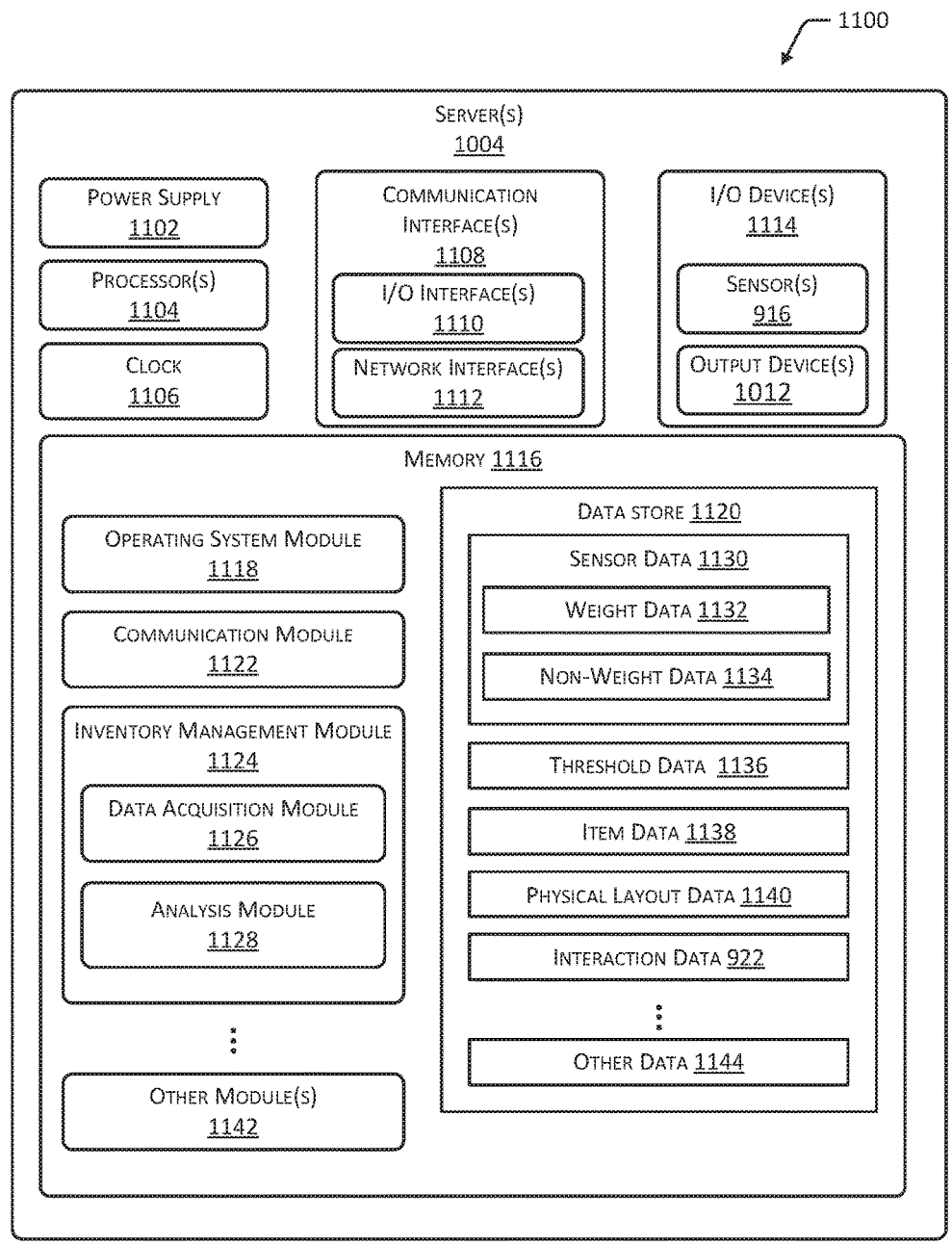
FIG. 11 is a block diagram of a server to support operation of the facility, according to some implementations.

FIG. 11 illustrates a block diagram 1100 of a server 1004 configured to support operation of the facility 902, according to some implementations. The server 1004 may be physically present at the facility 902, may be accessible by the network 1002, or a combination of both. The server 1004 does not require end-user knowledge of the physical location and configuration of the system that delivers the services. Common expressions associated with the server 1004 may include "on-demand computing", "software as a service (SaaS)", "platform computing", "network-accessible platform", "cloud services", "data centers", and so forth. Services provided by the server 1004 may be distributed across one or more physical or virtual devices.

One or more power supplies 1102 may be configured to provide electrical power suitable for operating the components in the server 1004. The one or more power supplies 1102 may comprise batteries, capacitors, fuel cells, photovoltaic cells, wireless power receivers, conductive couplings suitable for attachment to an external power source such as provided by an electric utility, and so forth. The server 1004 may include one or more hardware processors 1104 (processors) configured to execute one or more stored instructions. The processors 1104 may comprise one or more cores. One or more clocks 1106 may provide information indicative of date, time, ticks, and so forth. For example, the processor 1104 may use data from the clock 1106 to associate a particular interaction with a particular point in time.

The server 1004 may include one or more communication interfaces 1108 such as input/output (I/O) interfaces 1110, network interfaces 1112, and so forth. The communication interfaces 1108 enable the server 1004, or components thereof, to communicate with other devices or components. The communication interfaces 1108 may include one or more I/O interfaces 1110. The I/O interfaces 1110 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1110 may couple to one or more I/O devices 1114. The I/O devices 1114 may include input devices such as one or more of a sensor 916, keyboard, mouse, scanner, and so forth. The I/O devices 1114 may also include output devices 1012 such as one or more of a display device 1012(3), printer, audio speakers, and so forth. In some embodiments, the I/O devices 1114 may be physically incorporated with the server 1004 or may be externally placed.

The network interfaces 1112 may be configured to provide communications between the server 1004 and other devices, such as the totes 914, routers, access points 1010, and so forth. The network interfaces 1112 may include devices configured to couple to personal area networks (PANs), local area networks (LANs), wireless local area networks (WLANS), wide area networks (WANs), and so forth. For example, the network interfaces 1112 may include devices compatible with Ethernet, Wi-Fi, Bluetooth, ZigBee, and so forth.

The server 1004 may also include one or more busses or other internal communications hardware or software that allow for the transfer of data between the various modules and components of the server 1004.

As shown in FIG. 11, the server 1004 includes one or more memories 1116. The memory 1116 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1116 provides storage of computer-readable instructions, data structures, program modules, and other data for the operation of the server 1004. A few example functional modules are shown stored in the memory 1116, although the same functionality may alternatively be implemented in hardware, firmware, or as a system on a chip (SoC).

The memory 1116 may include at least one operating system (OS) module 1118. The OS module 1118 is configured to manage hardware resource devices such as the I/O interfaces 1110, the I/O devices 1114, the communication interfaces 1108, and provide various services to applications or modules executing on the processors 1104. The OS module 1118 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1116 may be a data store 1120 and one or more of the following modules. These modules may be executed as foreground applications, background tasks, daemons, and so forth. The data store 1120 may use a flat file, database, linked list, tree, executable code, script, or other data structure to store information. In some implementations, the data store 1120 or a portion of the data store 1120 may be distributed across one or more other devices including the servers 1004, network attached storage devices, and so forth.

A communication module 1122 may be configured to establish communications with one or more of the totes 914, sensors 916, display devices 1012(3), other servers 1004, or other devices. The communications may be authenticated, encrypted, and so forth.

The memory 1116 may store an inventory management module 1124. The inventory management module 1124 is configured to provide the inventory functions as described herein with regard to the inventory management system 920. For example, the inventory management module 1124 may track items 904 between different fixtures, to and from the totes 914, and so forth. The inventory management module 1124 may access sensor data 1130. The sensor data 1130 may include the weight data 1132, non-weight data 1134, such as obtained from other sensors 916 such as cameras 916(1), depth sensors 916(2), and so forth.

The inventory management module 1124 may include one or more of a data acquisition module 1126 and an analysis module 1128. The data acquisition module 1126 may be configured to acquire and access information associated with operation of the facility 902. For example, the data acquisition module 1126 may be configured to acquire the sensor data 1130, such as the weight data 1132, the non-weight data 1134 such as the image data, and so forth.

The analysis module 1128 is configured to process other sensor data 1130 to determine interaction data 922. The sensor data 1130 may include weight data 1132 obtained from the load cell transducers 514 and non-weight data 1134 obtained from other sensors, such as image data from cameras 916(1), depth sensor data from the depth sensors 916(2), data from instrumented auto facing units 916(14) and so forth.

Threshold data 1136 may specify one or more thresholds used by the analysis module 1128 to determine changes in a quantity of items 904 at a particular fixture, or portion thereof. For example, the threshold data 1136 may specify a minimum variance in weight that is indicative of a change in quantity of items 904 at a fixture.

The inventory management system 920 may maintain and utilize item data 1138 and physical layout data 1140. The item data 1138 comprises information about a particular type of item 904. The item data 1138 may include information indicative of a weight of a single item 904, or a package, kit, or other grouping considered to be a single item 904. The item data 1138 may include other characteristics of that type of item 904 such as: physical dimensions, characteristics about how the item 904 appears, and so forth. For example, the item data 1138 may comprise a plurality of local descriptor values generated by feature extraction algorithms, parameters for classifiers, neural network configuration data, and so forth, that characterizes the appearance of a representative of one or more of the item 904. The item data 1138 may indicate the types and quantities of items 904 that are expected to be stored at that particular fixture 100 or portion thereof, such as a particular lane. The item data 1138 may include other data. For example, the other data may comprise weight distribution of the item 904, point cloud data for the item 904, and so forth.

The physical layout data 1140 may provide information indicative of where fixtures are in the facility, location of sensors, information about sensor orientation and field of view (where applicable), and so forth. For example, the physical layout data 1140 may comprise information representative of a map or floor plan of the facility with relative positions of fixtures, planogram data indicative of how types of items 904 are to be arranged at the fixtures, and so forth. In another example, the physical layout data 1140 may comprise information indicating the particular placement of load cell transducers 514 on a particular fixture.

The interaction data 922 provides information about an interaction, such as a pick of an item 904 from the fixture, a place of an item 904 to the fixture, a touch made to an item 904 at the fixture, a gesture associated with an item 904 at the fixture, and so forth. The interaction data 922 may include one or more of the type of interaction, interaction location identifier indicative of the fixture at which the interaction took place, an item identifier indicative of a type of item 904 or particular item 904, quantity change to the item 904, user identifier, and so forth. The interaction data 922 may then be used to further update the item data 1138. For example, the quantity of items 904 on hand at a particular partitioned area on the fixture may be changed based on an interaction that picks or places one or more items 904.

Processing of image data may be performed by an image processing module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 1130 or other data. For example, the ANN may be trained using a supervised learning algorithm such that object identifiers are associated with images of particular objects within training images provided to the ANN. Once trained, the ANN may be provided with the sensor data 1130 to determination of similarity between two or more images, provide object identification, and so forth.

Other modules 1142 may also be present in the memory 1116 as well as other data 1144 in the data store 1120. For example, the other modules 1142 may include an accounting module while the other data 1144 may include billing data. The accounting module may be configured to assess charges to an account associated with a particular user 912 or other entities, while the billing data may include information such as payment account numbers.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques and devices described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A fixture comprising:
  a shelf comprising:
    a rear stiffener attached to an underside of the shelf; and
    a front stiffener attached to the underside of the shelf;
  a frame comprising:
    a left bracket extending from a left side of the frame, wherein the left bracket includes a first set of engagement features;
    a right bracket extending from a right side of the frame, wherein the right bracket includes a second set of engagement features;
    a first stiffener feature comprising a first portion of the frame that curves downwards; and
    a hole through the frame; and
  a load cell assembly comprising:
    a transducer affixed to a portion of a load cell plate, wherein the load cell plate has a first end and a second end;
    a spacer arranged between an upper side of the first end of the load cell plate and an underside of the frame;
    a first fastener that joins, as separated by the spacer, the upper side of the first end of the load cell plate to the underside of the frame;
    a first mounting post that joins an upper side of the second end of the load cell plate to an underside of a load mount; and
    a second mounting post that joins an upper side of the load mount to the underside of the shelf, wherein the load mount passes through the hole in the frame.

2. The fixture of claim 1, wherein the load mount comprises an elastomeric material and the transducer comprises an electrically resistive strain gauge.

3. The fixture of claim 1, further comprising a circuit board underneath the frame, the circuit board comprising:
  an analog filter having an input connected to an output of the transducer;
  an analog to digital converter (ADC) having an input connected to an output of the analog filter;
  a processor connected to an output of the ADC;
  a memory connected to the processor;
  a light emitting diode connected to the processor;
  a light pipe optically coupled to the light emitting diode;
  a communication interface connected to the processor;
  the processor configured to execute instructions stored in the memory to:
    determine load cell data using output of the ADC; and
    send the load cell data to an external device using the communication interface; and
  the fixture further comprising:
    a housing affixed to the underside of the frame, wherein the circuit board is within the housing.

4. A fixture comprising:
  a shelf;
  a first stiffener attached to an underside of the shelf;
  a frame comprising:
    a left bracket;
    a right bracket; and
    a first hole through the frame; and
  a first load cell assembly comprising:
    a transducer affixed to a portion of a first load cell plate, wherein the first load cell plate has a first end and a second end;
    a first spacer arranged between an upper side of the first end of the first load cell plate and an underside of the shelf;
    a first fastener that joins, as separated by the first spacer, the upper side of the first end of the first load cell plate to an underside of the frame;
    a second fastener that joins an upper side of the second end of the first load cell plate to an underside of a first load mount; and
    a third fastener that joins an upper side of the first load mount to the underside of the shelf, wherein the first load mount passes through the first hole in the frame.

5. The fixture of claim 4, the frame further comprising:
  a second hole through the frame, the second hole having:
    a left edge proximate to the left bracket;
    a right edge proximate to the right bracket;
    a front edge proximate to a front of the frame, wherein at least a portion of the front edge is bent downwards to form a first stiffening feature; and
    a rear edge proximate to a rear of the frame, wherein at least a portion of the rear edge is bent downwards to form a second stiffening feature.

6. The fixture of claim 4, the frame further comprising:
  a front edge proximate to a front of the frame, wherein at least a portion of the front edge is bent downwards to form a first stiffening feature; and
  a rear edge proximate to a rear of the frame, wherein at least a portion of the rear edge is bent downwards to form a second stiffening feature.

7. The fixture of claim 4, wherein the first load mount comprises one or more of natural rubber, silicone rubber, or a spring.

8. The fixture of claim 4, wherein a center of the first load mount is located at a distance from a left edge of the frame that is between 0.23 and 0.43 of a width of the frame.

9. The fixture of claim 4, wherein:
  the first stiffener comprises a piece of material having a long axis and at least one bend in the piece of material that is parallel to the long axis to form a first lip.

10. The fixture of claim 9, the frame further comprising:
  a second hole through the frame, the second hole having:
    a first edge, wherein at least a portion of the first edge is bent downwards to form a first stiffening feature that is proximate to a portion of the first lip.

11. The fixture of claim 4, wherein the first hole through the frame is proximate to a first corner of the frame;
  the frame further comprising:
    a second hole through the frame that is proximate to a second corner of the frame;
    a third hole through the frame that is proximate to a third corner of the frame; and
    a fourth hole through the frame that is proximate to a fourth corner of the frame; and
  the fixture further comprising:
    a second load cell assembly, wherein a second load mount passes through the second hole in the frame;
    a third load cell assembly, wherein a third load mount passes through the third hole in the frame; and
    a fourth load cell assembly, wherein a fourth load mount passes through the fourth hole in the frame.

12. The fixture of claim 4, the shelf further comprising a front feature comprising a lip that extends upwards to form a first U shaped cross section; and the fixture further comprising:
a ticket channel having a second U shaped cross section that opens downward and that is configured to accept at least a portion of the lip of the front feature.

13. The fixture of claim 12, the ticket channel further comprising:
a third U shaped cross section that opens upward; and
one or more ridges within the third U shaped cross section.

14. The fixture of claim 4, wherein the frame comprises a single piece of material.

15. The fixture of claim 4, wherein:
the first fastener is configured to be engaged from underneath the frame; and
the second fastener is configured to be engaged from underneath the frame.

16. The fixture of claim 4, further comprising:
a bottom cover configured to cover the underside of the frame and the first load cell assembly; the bottom cover comprising:
a recess; and
a foot within the recess, wherein the foot protrudes beyond an underside of the bottom cover.

17. A fixture comprising:
a frame comprising:
  a first hole through the frame; and
  a first stiffening feature comprising at least a portion of the frame bent downwards at a first edge; and
a first load cell assembly comprising:
  a transducer affixed to a portion of a first load cell plate, wherein the first load cell plate has a first end and a second end;
  a first fastener that joins an upper side of the first end of the first load cell plate to an underside of the frame;
  a second fastener that joins an upper side of the second end of the first load cell plate to an underside of a first load mount; and
  a third fastener that joins an upper side of the first load mount to an underside of a load, wherein the first load mount passes through the first hole in the frame.

18. The fixture of claim 17, the frame further comprising:
a bracket extending from the frame, wherein the bracket comprises one or more of:
  a first hook extending away from a body of the bracket; or
  a first tab extending away from the body of the bracket.

19. The fixture of claim 17, wherein the first end of the first load cell plate is thicker than the second end of the first load cell plate.

20. The fixture of claim 17, wherein:
the first fastener is configured to be engaged from underneath the frame;
the second fastener is configured to be engaged from underneath the frame; and
the third fastener is configured to be engaged from underneath the frame.

21. The fixture of claim 17, further comprising:
a first stiffener attached to the underside of the load, wherein the first stiffener comprises a piece of material having a long axis and at least one bend in the piece of material that is parallel to the long axis to form a first lip extending down from the underside of the load; and
wherein the first stiffening feature comprising the at least a portion of the frame bent downwards at the first edge forms a second lip, wherein the first lip and the second lip are proximate to one another.

22. The fixture of claim 17, further comprising a circuit board underneath the frame, the circuit board comprising:
a filter having an input connected to an output of the transducer;
an analog to digital converter (ADC) having an input connected to an output of the filter;
a processor connected to an output of the ADC;
a memory connected to the processor;
a light emitting diode connected to the processor;
a light pipe optically coupled to the light emitting diode;
a communication interface connected to the processor;
the processor configured to execute instructions stored in the memory to:
  determine load cell data using the output of the ADC; and
  send the load cell data to an external device using the communication interface.

* * * * *